(12) United States Patent  
Kauffmann

(10) Patent No.: US 9,913,023 B2  
(45) Date of Patent: *Mar. 6, 2018

(54) MULTI-SOUND AUDIO INTERFACE SYSTEM

(71) Applicant: Google Inc., Mountain View, CA (US)

(72) Inventor: Alejandro José Kauffmann, San Francisco, CA (US)

(73) Assignee: Google LLC, Mountain View, CA (US)

(*) Notice: Subject to any disclaimer, the term of this patent is extended or adjusted under 35 U.S.C. 154(b) by 348 days.

This patent is subject to a terminal disclaimer.

(21) Appl. No.: 14/702,337

(22) Filed: May 1, 2015

(65) Prior Publication Data

US 2015/0350767 A1  Dec. 3, 2015

Related U.S. Application Data

(63) Continuation of application No. 14/289,203, filed on May 28, 2014, now Pat. No. 9,026,914.

(51) Int. Cl.
| | |
|---|---|
| *G06F 3/048* | (2013.01) |
| *H04R 1/10* | (2006.01) |
| *G06F 3/16* | (2006.01) |
| *H04S 7/00* | (2006.01) |
| *G06F 3/01* | (2006.01) |
| *G06F 3/0482* | (2013.01) |
| *H04R 5/033* | (2006.01) |

(52) U.S. Cl.
CPC ........... *H04R 1/1091* (2013.01); *G06F 3/167* (2013.01); *H04R 1/1041* (2013.01); *H04S 7/304* (2013.01); *G06F 3/012* (2013.01); *G06F 3/017* (2013.01); *G06F 3/0482* (2013.01); *H04R 5/033* (2013.01)

(58) Field of Classification Search
CPC ..................................................... G06F 3/0481
See application file for complete search history.

(56) References Cited

U.S. PATENT DOCUMENTS

| | | | |
|---|---|---|---|
| 6,820,056 B1 | 11/2004 | Harif | |
| 7,143,039 B1* | 11/2006 | Stifelman | ............... G10L 15/22 379/88.01 |

(Continued)

OTHER PUBLICATIONS

International Search Report and Written Opinion of International Application No. PCT/US2015/029226, dated Jul. 29, 2015, 12 pp.

(Continued)

*Primary Examiner* — Matthew Ell  
(74) *Attorney, Agent, or Firm* — Shumaker & Sieffert, P.A.

(57) ABSTRACT

A computing device includes at least one processor; and at least one module, operable by the at least one processor to associate, for an audio interface, a first sound with first information, and associate, for the audio interface, a second sound with second information, wherein the second sound shares at least one perceptual property with a first plurality of perceptual properties based at least in part on a relationship between the first information and the second information. The at least one module may be operable to output in parallel, using an audio output device, the first and second sounds in the audio interface; receive an indication of user input that selects at least one of the first or second information; and perform, based at least in part on the indication of user input, at least one operation corresponding to the at least one of the first or second information.

15 Claims, 5 Drawing Sheets

(56) References Cited

U.S. PATENT DOCUMENTS

| | | | |
|---|---|---|---|
| 7,697,922 | B2 | 4/2010 | McQuaide, Jr. et al. |
| 8,380,333 | B2 | 2/2013 | Ojala |
| 8,478,867 | B1 | 7/2013 | Queru |
| 8,630,685 | B2 | 1/2014 | Schrage |
| 8,655,004 | B2 | 2/2014 | Prest et al. |
| 8,923,995 | B2 | 12/2014 | Lindahl et al. |
| 9,026,914 | B1 | 5/2015 | Kauffmann |
| 9,167,368 | B2 | 10/2015 | De Jong et al. |
| 9,367,960 | B2 | 6/2016 | Poulos et al. |
| 2003/0018477 | A1* | 1/2003 | Hinde ............ G11B 19/025 704/273 |
| 2009/0097689 | A1 | 4/2009 | Prest et al. |
| 2013/0154930 | A1 | 6/2013 | Xiang et al. |
| 2013/0163765 | A1 | 6/2013 | DeJong et al. |
| 2014/0129937 | A1 | 5/2014 | Jarvinen et al. |
| 2014/0235169 | A1 | 8/2014 | Parkinson et al. |
| 2014/0359450 | A1* | 12/2014 | Lehtiniemi ........... G06F 3/0488 715/727 |

OTHER PUBLICATIONS

International Preliminary Report on Patentability from International Application No. PCT/US2015/029226, dated Dec. 8, 2016, 8 pp.
Marentakis, et al., "A Study on Gestural Interaction with a 3D Audio Display," Lecture Notes in Computer Science, Sep. 13, 2004, vol. 3160, pp. 180-191.
Vazquez-Alvarez, "An Investigation of Eyes-Free Spatial Auditory Interfaces for Mobile Devices: Supporting Multitasking and Location-Based Information," Jul. 31, 2013, 175 pp.
Android Open Source Project—Issue Tracker, Issue 5012—android—Notifications interrupt music playback—Android Open Source Project—Issue Tracker—Google Project Housing, https://code.google.com/p/android/issues/detail?id=5012, downloaded on May 28, 2014, 27 pages.
Phandroid, Notifications ????—Android Forums, downloaded from https://androidforums.com/samsung-galaxy-note/523428-notifications.html, downloaded on May 28, 2014, 4 pages.
[Req] Patched Phone.apk for Working Native Voicemail Notifications, Linuxine, http://www.linuxine.com/story/req-patched-phoneapk-working-native-voicemail-notifications, downloaded on May 28, 2014, 2 pages.
My Fourth Descent to ADD, My fourth descent into ADD>>iPhone OS 3.0—First look, https://jordanbalagot.com/blog/2009/03/18/iphone-os-30-first-look/, downloaded on May 28, 2014, 11 pages.
Welcome to the Multimodal Interaction Group Home Page Maintained by Prof. Stephen Brewster, The Glasgow Multimodal Interaction Group HomePage incorporating the Earcons HomePage, http://www.dcs.gla.ac.uk/~stephen/, downloaded on May 28, 2014, 3 pages.
HCI Lecture 12 Sound and User Interfaces, http://www.psy.gla.ac.uk/~steve/HCI/cscln/trail1/lecture12.htm, downloaded on May 28, 2014, 2 pages.
Research projects within the Group, Research done in the Glasgow Multimodal Interaction Group, http://www.dsc.gla.ac.uk/~stephen/research.shtml, downloaded on May 28, 2014, 7 pages.
Providing a structured method for integrating non-speech audio into human-computer interfaces, Thesis Introduction, Earcons, http://www.dcs.gla.ac.uk/~stephen/ThesisIntroAbs/thesisIntro.html, downloaded on May 28, 2014, 12 pages.
Brewster, "Providing a Structured Method for Integrating Non-Speech Audio into Human-Computer Interfaces," http://www.dcs.gla.ac.uk/~stephen, Aug. 1994, 292 pages.
Brewster et al., "Earcons as a Method of Providing Navigational Cues in a Menu Hierarchy," In Proceedings of BCS HCI'96, 1996, 14 pages.
"Structured Menu Presentation Using Spatial Sound Separation," ACM Digital Library, http://dl.acm.org/citation.cfm?id=758126, 2 pages, downloaded on May 28, 2014.
Jeon et al., ""Spindex": Accelerated Intitial Speech Sounds Improve Navigation Performance in Auditory Menus," In Human Factors and Ergonomics Society, 2009, 5 pages.
"Aspect of Music," Aspect of Music—Wikipedia, the free encyclopedia, http://en.wikipedia.org/wiki/Aspect_of_music, downloaded on Apr. 9, 2014, 4 pages.
Technology Reports, "Using Earphones to Perform Gaze Detection for Wearable Interfaces," NTT DOCOMO Technical Journal vol. 12, No. 3, 6 pages, downloaded on May 28, 2014.
New Technology Turns Earphones Into Pulse Wave Sensor, Tech & Industry Analysis from Asia, http://techon.nikkeibp.co.jp/english/NEWS_EN/20131025/311441, Downloaded on May 28, 2014, 2 pages.
Hamanaka et al., "Sound Scope Headphones: Controlling an Audio Mixer through Natural Movement," 2009, 4 pages.
The Dash—Wireless Smart In Ear Headphones, Kickstarter, https://www.kickstarter.com/projects/helobragi/the-dash-wireless-smart-in-ear-headphones, downloaded on May 28, 2014, 23 pages.
Ghomi et al., "Using Rythmic Patterns as an Input Method," Author manuscropt, published in "CHI'12: Proceedings of the SIGCHI Conference on Human Factors and Computing Systems, Austin: United States (2012)" DOI: 10.1145/2207676.2208579, 10 pages.
Sargin, "Analysis of Head Gesture and Prosody-Driven Head-Gesture and Prosody Patterns for Prosody-Driven Head-Gesture Animation," IEEE Transactions on Pattern Analysis and Machine Intellegence, vol. 30, Issue 8, Aug. 2008, 15 pages.
Morency et al., "Head Gestures for Perceptual Interfaces: The Role of Context in Improving Recognition," 2006, 24 pages.
Pantic et al., "Implicit Human-Centered Tagging," Social Sciences, IEEE Signal Processing Magazine, 173, Nov. 2009, 8 pages.
Marentakis, A Study on Gestural Interaction with a 3D Audio Display, 2004, http://www.dcs.gla.ac.uk/jhw/audioclouds/publications.html, 12 pp.
U.S. Appl. No. 14/289,203, filed May 28, 2014 by Alejandro Jose Kauffmann.
Prosecution History from U.S. Appl. No. 14/289,203, dated Sep. 29, 2014 through Dec. 23, 2014, 19 pp.

* cited by examiner

MULTI-SOUND AUDIO INTERFACE SYSTEM

RELATED APPLICATION

This application is a Continuation of U.S. patent application Ser. No. 14/289,203, filed May 28, 2014, the entire content of which is hereby incorporated by reference.

BACKGROUND

Computing user interfaces generally receive input entered by a user and output information for consumption by the user. Examples of user interfaces include graphical user interfaces, audio user interfaces, and kinetic user interfaces. Some audio user interfaces may output indications of information to a user in the form of sounds (rather than through visual or kinetic output, for example). However, as the number of instances of information output by a computing device at an audio interface increases, the time and/or effort required by a user to differentiate among these indications may also increase.

SUMMARY

In some examples, a method includes associating, by a computing device and for an audio interface, a first sound with first information, the first sound characterized by a first plurality of perceptual properties; associating, for the audio interface, a second sound with second information, wherein the second sound indicates the second information and is characterized by a second plurality of perceptual properties that share at least one perceptual property with the first plurality of perceptual properties based at least in part on a relationship between the first information and the second information; providing, for output in parallel at an audio output device, the first and second sounds in the audio interface, such that the relationship between the first and second information is perceptible in the audio interface based at least in part on the at least one perceptual property shared between the first and second pluralities of perceptual properties; receiving an indication of user input that selects at least one of the first or second information; and performing, based at least in part on the indication of user input, at least one operation corresponding to the at least one of the first or second information.

In some examples, a computer-readable storage medium is encoded with instructions that, when executed, cause at least one processor of a computing device to: associate, for an audio interface, a first sound with first information, the first sound characterized by a first plurality of perceptual properties; associate, for the audio interface, a second sound with second information, wherein the second sound indicates the second information and is characterized by a second plurality of perceptual properties that share at least one perceptual property with the first plurality of perceptual properties based at least in part on a relationship between the first information and the second information; provide, for output in parallel at an audio output device, the first and second sounds in the audio interface, such that the relationship between the first and second information is perceptible in the audio interface based at least in part on the at least one perceptual property shared between the first and second pluralities of perceptual properties; receive an indication of user input that selects at least one of the first or second information; and perform, based at least in part on the indication of user input, at least one operation corresponding to the at least one of the first or second information.

In some examples, a computing device includes at least one processor; and at least one module, operable by the at least one processor to: associate, for an audio interface, a first sound with first information, the first sound characterized by a first plurality of perceptual properties; associate, for the audio interface, a second sound with second information, wherein the second sound indicates the second information and is characterized by a second plurality of perceptual properties that share at least one perceptual property with the first plurality of perceptual properties based at least in part on a relationship between the first information and the second information; provide, for output in parallel at an audio output device, the first and second sounds in the audio interface, such that the relationship between the first and second information is perceptible in the audio interface based at least in part on the at least one perceptual property shared between the first and second pluralities of perceptual properties; receive an indication of user input that selects at least one of the first or second information; and perform, based at least in part on the indication of user input, at least one operation corresponding to the at least one of the first or second information.

The details of one or more examples are set forth in the accompanying drawings and the description below. Other features, objects, and advantages of the disclosure will be apparent from the description and drawings, and from the claims.

DETAILED DESCRIPTION

Figure 1:
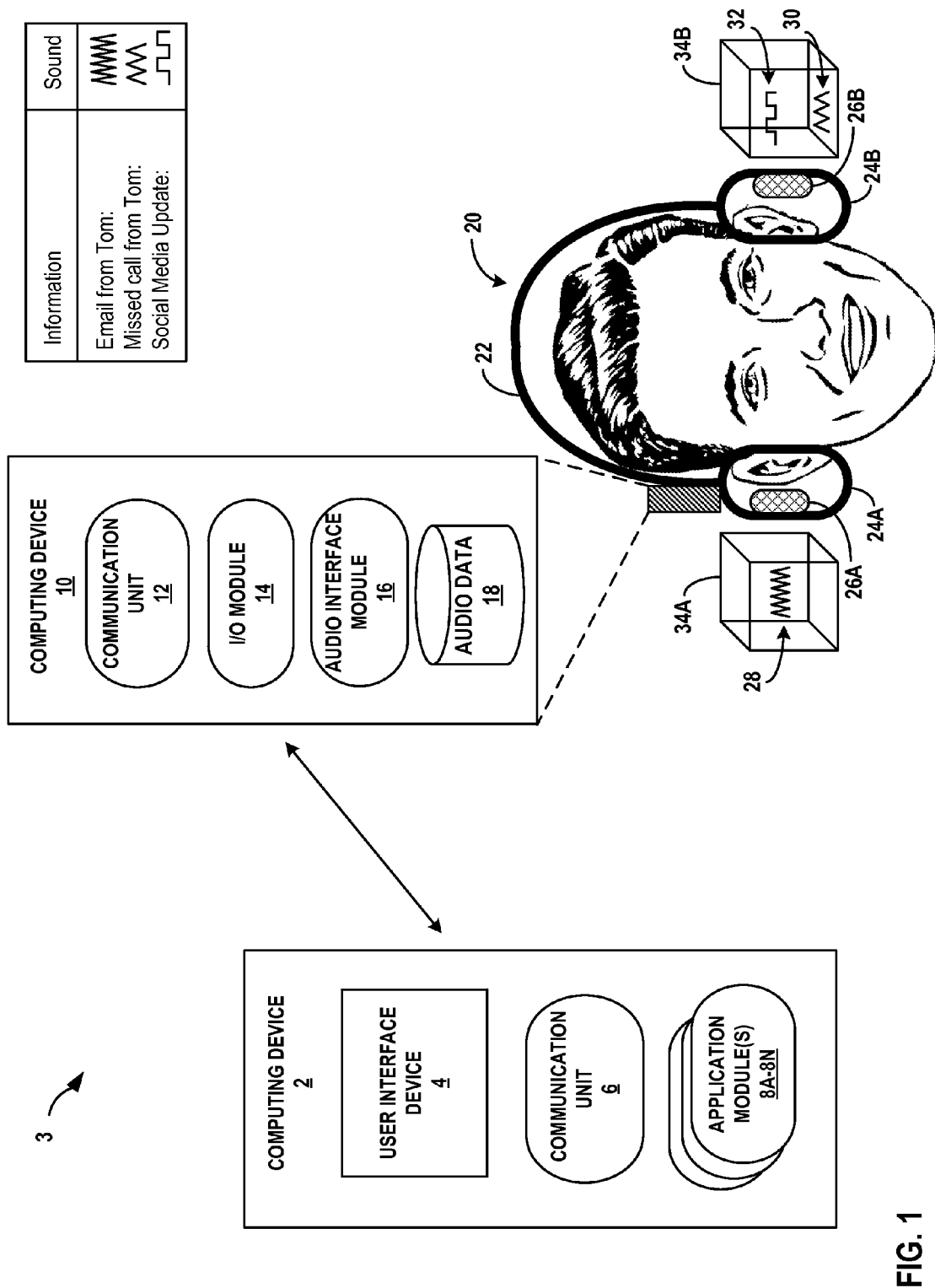
FIG. 1 is a conceptual diagram illustrating an example system including a computing device and wearable apparatus that outputs in parallel, in an audio user interface, multiple sounds with one or more shared perceptual properties in accordance with one or more aspects of the present disclosure.

In general, this disclosure is directed to techniques for outputting, in parallel, in an audio user interface, multiple sounds with one or more shared perceptual properties that may indicate one or more relationships between information associated with the sounds. In some implementations, each sound may indicate different information, and/or a relationship between perceptual properties of two or more sounds may indicate a relationship between the different, corresponding information associated with each sound. To illustrate, in some implementations, a wearable apparatus (such as smart headphones) may include a computing device and one or more audio output devices (e.g., speakers) controlled by the computing device. The computing device of the wearable apparatus may receive different information from one or more remote computing devices (such as a smartphone communicatively coupled to the computing device of the wearable apparatus). Examples of such information may include, for example, notifications of received email, phone calls, text messages, instant messages, social media activity, map information, and/or calendar events.

For example, rather than outputting the verbal sound "A new email has arrived from Tom," a wearable apparatus implementing techniques of the disclosure may, in the above example, associate a non-verbal sound with a new email from a sender named Tom. The non-verbal sound may have one or more perceptual properties, such as a distinct tone and/or tempo. In the example, the tone may indicate that the sender is Tom, and the tempo may indicate that the information is an email. A different non-verbal sound may be associated with a missed call from Tom, with the different non-verbal sound including the same tone as described above with relation to an email received from Tom, thereby indicating that the sender is Tom, with a different tempo indicating that the information is a missed call (rather than an email). To provide an audio user interface that indicates multiple, different instances of information, techniques of the disclosure may cause, in the example, the non-verbal sound for the email from Tom and the non-verbal sound for the missed call from Tom to be output in parallel at the wearable apparatus. Because the two, non-verbal sounds share a common perceptual property (e.g., tone), a user of the wearable apparatus may discern that two different types of information are provided (e.g., based on different tempo) from the same sender (e.g., based on the same tone). Consequently, techniques of the disclosure may provide, in an audio user interface, multiple indications of different information in an understandable form to the user. That is, techniques of the disclosure may output indications of multiple, different information in parallel without, for example, outputting multiple verbal sounds "a new email has arrived from Tom" and "a missed call from Tom" in parallel, which may not be decipherable to a user, or in sequence which may require more time to output.

In this way, techniques of the disclosure may provide indications of multiple, different information in parallel, such that a user may quickly and intuitively interact with an audio interface. Although the example above provides one example of outputting multiple, different sounds in parallel with a shared perceptual property to indicate a relationship between different information in an audio interface, many other examples of outputting multiple, different sounds with a shared perceptual property to indicate a relationship between different information in an audio user interface are possible, as further described below.

FIG. 1 is a conceptual diagram illustrating an example system including a computing device and wearable apparatus that outputs in parallel, in an audio user interface, multiple sounds with one or more shared perceptual properties, which may indicate one or more relationships between information associated with the sounds, in accordance with one or more aspects of the present disclosure. As further described below, outputting first and second sounds in parallel may include at least a portion of the first sound partially overlapping with at least a portion of the second sound. As shown in FIG. 1, system 3 includes computing device 2, wearable apparatus 20, and computing device 10 that is physically coupled to wearable apparatus 20 and communicatively coupled to computing device 2.

Wearable apparatus 20 in the example of FIG. 1 is illustrated as smart headphones, which may be outer-ear headphones. Smart headphones 20 may include a headband 22 that is physically coupled to ear coverings 24A-24B ("ear coverings 24"). Headband 22 may be any suitable semi-flexible and curved material that can rest on a user's head to support ear coverings 24. Ear coverings 24 (or ear muffs) may be comprised of any suitable, rigid or semi-rigid material and formed as substantially half-sphere or conical shapes. As shown in FIG. 1, a portion of each of ear coverings 24 may contact the user's head to enclose each respective ear. For purposes of illustration only, ear coverings 24 are illustrated as transparent to show a user's ears within the ear covers and, audio output devices, for example, speakers 26A-26B affixed within the ear coverings. Audio output devices, such as speakers 26, may be any output device that outputs sound. Speakers 26A-26B ("speakers 26") may be operatively coupled to computing device 10, such that computing device 10 may control sound output at one or more of speakers 26. Speakers 26 may receive information from computing device 10 and output the information as sound.

For purposes of illustration, techniques of the disclosure are described with respect to wearable apparatus 20 as smart headphones. However, techniques of the disclosure may also be implemented in, but not limited to: in-vehicle automotive audio systems, optical head-mounted computing devices, in-ear headphones (such as ear buds), ear-mounted computing devices, wrist-mounted computing devices (such as smart watches), stationary and/or semi-fixed audio systems (such as a conference room or household room audio system), etc.

Wearable apparatus 20 may also include, be affixed to, or integrated with computing device 10. Computing device 10 may include one or more processors and memory as further illustrated in FIG. 2. In some examples, computing device 10 may be designed as a miniature form-factor computing device that is integrated with, included in, or attached to wearable apparatus 20. In some examples, a miniature form factor computing device may fit within dimensions of four inches wide, by four inches deep, by four inches long. In some examples, a miniature form factor computing device may be characterized by a size that does not substantially encumber a user that is wearing the wearable apparatus to which the miniature form factor computed device is affixed.

In some examples, computing device 10 may include a communication unit 12, input/output (I/O) module 14, audio interface module 16, and audio data 18. Communication unit 12 may send and/or receive data with one or more computing devices. In some examples, communication unit 12 supports wireless and/or wired communication. Communication unit 12 may send and/or receive data using any variety of communication protocols. Further details of communication unit 12 are provided in FIG. 2

Computing device 10 may also include I/O module 14. I/O module 14 may send information to speakers 26 that is received from other components of computing device 10, such as audio interface module 16, communication unit 12, audio data 18, etc., or any other components communicatively coupled to computing device 10. A component may be any hardware, software, firmware, and/or information. I/O module 14 may also receive information from a component (e.g., an input device) of computing device 10, wearable apparatus 20, or any other components communicatively coupled to computing device 10, and send the information to another component of computing device 10. Generally, I/O module 14 may facilitate the transmission of information between components included in computing device 10, wearable apparatus 20, or any other components communicatively coupled to computing device 10.

In some examples, computing device 10 may also include an audio interface module 16. Audio interface module 16 may implement techniques for outputting in parallel, in an audio user interface, multiple sounds with one or more shared perceptual properties, which may indicate one or more relationships between information associated with the sounds. In some examples, audio interface module 16 may generate, maintain, and control an audio interface that presents and/or receives information from a user. Audio interface module 16 is further described below in the examples of this disclosure. Computing device 10 may include more or fewer components than shown in the example of FIG. 1. For instance, computing device 10 may include, but is not limited to, one or more input devices, output devices, sensors, power sources (e.g., batteries), etc.

Modules 14 and 16 may perform operations described herein using software, hardware, firmware, or a mixture of both hardware, software, and firmware residing in and/or executing on computing device 10. Computing device 10 may execute modules 14 and 16 with one or more processors. Computing device 10 may execute any of modules 14 and 16 as or within a virtual machine executing on underlying hardware. Modules 14 and 16 may be implemented in various ways. For example, any of modules 14 and 16 may be implemented as a downloadable or pre-installed application or "app." In another example, any of modules 14 and 16 may be implemented as part of an operating system of computing device 10.

Computing device 10 may store audio data 18. Audio data 18 may include one or more representations of different sounds. A representation of sound may be a file or other suitable structured data stored on and/or streamed to computing device 10, that when processed causes one or more of speakers 26 to output the sound. As further described herein, audio interface module 16 may associate a sound with specific information, and output such sound.

Computing device 10 may send and/or receive information with other computing devices, such as computing device 2. In the example of FIG. 1, computing device 2 may be a smartphone. However, in other examples, computing device 2 may include, but is not limited to, a tablet computer, a personal digital assistant (PDA), a laptop computer, a portable gaming device, a portable media player, an e-book reader, a watch, television platform, server device, in-vehicle automotive audio system, wearable computing device (e.g., optical head-mounted computing device, in-ear headphones, ear-mounted computing devices, wrist-mounted computing devices, stationary), and/or semi-fixed audio systems (such as a conference room or household room audio system). Computing device 2 may also send and/or receive information with one or more computing devices other than computing device 10. Examples of such one or more computing devices may be any computing device described as an example of computing device 2.

Computing device 2, as shown in FIG. 1, may include a user interface device 4, communication unit 6, and one or more application modules 8A-8N ("application modules 8"). User interface device 4 of computing device 2 may function as an input device and/or as an output device for computing device 2. In some examples, user interface device 4 may include an integrated presence-sensitive input device and a display device. For instance, user interface device 4 may function as a presence-sensitive input device using a presence-sensitive screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. User interface device 4 may function as an output device using any one or more of a liquid crystal display (LCD), dot matrix display, light emitting diode (LED) display, organic light-emitting diode (OLED) display, e-ink, or similar monochrome or color display capable of outputting visible information to the user of computing device 2.

User interface device 4 of computing device 2 may include a presence-sensitive screen that may detect user input from a user of computing device 2. User interface device 4 may receive indications of the user input by detecting one or more tap and/or non-tap gestures, continuous gestures, or other any multi-touch gestures from a user of computing device 2 (e.g., the user touching or pointing to one or more locations of user-interface device 4 with a finger or a stylus pen). A presence-sensitive screen of user interface device 4 may present output to a user. For instance, a presence-sensitive screen of user interface device 4 may present various graphical user interfaces of applications (e.g., an electronic message application, an Internet browser application) executing at computing device 2. A user of computing device 2 may provide user input at user interface device 4 to interact with one or more of these applications.

As shown in FIG. 1, computing device 2, in some examples, includes one or more application modules 8. Application modules 8A-8N ("application modules 8") may include functionality to perform any variety of operations on computing device 2. For instance, application modules 8 may include an phone call manager application, email application, text messing application, instant messaging application, weather application, video conferencing application, social networking application, weather application, stock market application, emergency alert application, sports application, news application, office productivity application, multimedia player, to name only a few examples.

Like computing device 10, computing device 2 may include a communication unit 6, Communication unit 6 may send and/or receive data with one or more computing devices. In some examples, communication unit 6 supports wireless and/or wired communication. Communication unit 6 may send and/or receive data using any variety of communication protocols. Further details of communication unit 6 are provided in FIG. 2

Modules 8 may perform operations described herein using software, hardware, firmware, or a mixture of both hardware, software, and firmware residing in and/or executing on computing device 2. Computing device 2 may execute modules 8 with multiple processors. Computing device 2 may execute any of modules 8 as or within a virtual machine executing on underlying hardware. Modules 8 may be implemented in various ways. For example, any of modules 8 may be implemented as a downloadable or pre-installed application or "app." In another example, any of modules 8 may be implemented as part of an operating system of computing device 10.

Rather than sequentially outputting verbal indications of different information (e.g., "a new email has arrived from Tom" followed by "a missed call from Tom"), techniques of the disclosure may output multiple, non-verbal sounds with one or more shared perceptual properties, which may indicate one or more relationships between information associated with the sounds. In this way, techniques of the disclosure may provide indications of multiple, different information in parallel, such that a user may quickly and intuitively interact with an audio interface. The techniques are now further described in detail with reference to FIG. 1.

In accordance with techniques of this disclosure, audio interface module 16 may provide an audio interface that enables a user to interface with computing device 10. An audio interface, generally, may maintain, organize, and/or provide information to a user using one or more sounds. In some examples, an audio interface may also receive user input in the form of sounds, such as spoken input; however, user input may also be received through tactile, kinetic, or other suitable forms of user input. The audio interface may be implemented using one or more data structures, processes, and/or hardware included at one or more of computing device 10, computing device 2, and/or other computing devices. In the example of FIG. 1, audio interface module 16 may implement such data structures and processes to provide the audio interface. Any suitable data structures may be used including, but not limited, to arrays, tables, maps, objects (that include data and operations), etc. Audio interface module 16 may maintain state for different sounds and information, maintain associations between information and sounds, and perform operations including operations on such sounds, information, and associations.

In some examples, computing device 10 may receive data from one or more other computing devices, such as computing device 2. For instance, communication unit 12 may receive from communication unit 6, data indicating an email received at computing device 2. As another example, communication unit 12 may receive from communication unit 6, data indicating that a phone call was missed at computing device 2. Upon receiving the data from communication unit 12, audio interface module 16 may determine information included in the data. Generally, information may represent or indicate one or more facts. Examples of information may include but are not limited to an instant message, a text message, a social media communication, a missed call, a voicemail, a calendar event, a location, a news event, a weather event, or any meta-data or content of such examples of information.

Audio interface module 16 may determine and/or select information at different levels of granularity. For instance, audio interface module 16 may determine as information that the sender of an email is "Tom." In another example, audio interface module 16 may determine as information, "a phone call was missed from Tom"—that is, the information indicates both that there was a missed call and that the caller was Tom. Thus, in some examples, information may represent a collection of multiple instances of information. Conversely, in some examples, information may represent an instance of information within a collection of information. In this way, audio interface module 16 may associate different sounds, having one or more shared perceptual properties, with different, but related instances of information (e.g., respective sounds for a missed call from Tom and an email from Tom having the same tone, but different tempo).

In accordance with techniques of the disclosure, audio interface module 16 may associate, in the audio interface, a first sound with first information, the first sound characterized by a first plurality of perceptual properties. A sound may be verbal or non-verbal. A sound that is verbal may include one or more words of a language that are output in audio form. A sound that is non-verbal does not include one or more words of a language, but is output in audio form. A non-verbal sound may be anthropomorphic, such that the non-verbal sound does not include words of a language but sounds as though generated by a human (e.g., humming, clicking, swishing, rasping, or any other wordless tone). A perceptual property may be any quality of a sound that changes its audio form when output. Examples of perceptual properties may include but are not limited to: a melody, a harmony, a rhythm, a tone, a form, a tempo, dynamics, a pitch, a timbre, an intensity, and a duration of the respective first sound or second sound. A sound may have one or more perceptual properties. In some examples, a perceptual property may be perceptible by a human.

In the example of FIG. 1, the first information may be a new email from a sender Tom. Computing device 2 may have received the email and sent data to computing device 10 indicating the new email from the sender Tom. Audio interface module 16 may determine a first sound 28 from audio data 18, and store data that indicates an association between the first information and first sound 28. As shown in FIG. 1, first sound 28 is represented visually; however, the visual representation of first sound 28 is for example purposes only and may not necessarily indicate the actual perceptual properties of first sound 28. First sound 28 may be characterized by one or more perceptual properties—in the example of FIG. 1, a distinct tone and tempo.

Audio interface module 16 may store data that indicates an association between a perceptual property of the distinct tone of first sound 28 and information that indicates the sender is Tom. Audio interface module 16 may store data that indicates an association between the distinct tempo of first sound 28 and information that indicates an email. In this way, audio interface module 16 may maintain data specifying that the tone indicates the sender is Tom and the tempo indicates the information is email. Audio interface module 16 may therefore maintain data that indications relationships between respective perceptual properties and different, respective information.

Audio interface module 16 may also associate, for the audio interface, a second sound with second information. The second sound may indicate second information and be characterized by a second plurality of perceptual properties that share at least one perceptual property with the first plurality of perceptual properties based at least in part on a relationship between the first information and the second information. For example, computing device 2 may determine a missed phone call has occurred and send data to computing device 10 indicating the missed call from the caller Tom. In the example of FIG. 1, the second information may indicate the missed call from caller Tom.

Audio interface module 16 may determine one or more relationships between the first information (indicating the email from Tom) and the second information (indicating the missed phone call from Tom). A relationship may indicate a way in which two different instances of information are related. A relationship may be established based on but not limited to a name, an identity, a location, an urgency of information, an importance of information, a time of information, a length of information, or a type of information.

Audio interface module 16 may determine that the sender of the email in the first information is the same as the sender of the missed phone call in the second information. In some examples, to determine at least one relationship between the first information and the second information, audio interface module 16 may compare one or more portions of first information to one or more portions of second information. For instance, audio interface module 16 may compare the sender identity of an email to a caller identity of a phone call. If the degree of similarity between the portion of first information and the portion of second information satisfies a threshold (e.g., greater than a threshold), audio interface module 16 may determine that a relationship exists. Audio interface module 16 may perform such comparisons for one or more portions of first information with any number of portions of any number of additional instances of information.

Based on determining that a relationship exists, audio interface module 16 may determine whether it has previously stored data indicating an association between a perceptual property, and the information that establishes the relationship. For instance, audio interface module 16 may determine whether data exists that indicates a relationship between a perceptual property (e.g., distinct tone) and information that indicates "Tom."

If no data exists indicating the relationship, audio interface module 16 may determine a perceptual property and store data indicating an association between the perceptual property and the information. In the example of FIG. 1, audio interface module 16 previously stored data indicating a relationship between the perceptual property (e.g., distinct tone) and information that indicates "Tom." Audio interface module 16, using the previously stored data, may define and/or select a second sound 30, using audio data 18, based on the relationship between the perceptual property (e.g., tone) and information that indicates "Tom." Second sound 30 may include the perceptual property (e.g., tone) associated with "Tom," and another perceptual property (e.g., tempo) that indicates a missed call. In this way, audio interface module 16 defines and/or selects second sound 30 to share at least one perceptual property with first sound 28, based at least in part on the relationship between the sender of the email ("Tom") and the caller of the missed call ("Tom"). As further described below, because first sound 28 and second sound 30 share at least one perceptual property that indicates a common caller/sender ("Tom"), a user the hears both first sound 28 and second sound 30 at the same or substantially the same time can discern that both an email and call from Tom were received.

Audio interface module 16 may store data that indicates an association between the second information and second sound 30. As shown in FIG. 1, second sound 30 is represented visually; however, the visual representation of second sound 30 is for example purposes only and may not necessarily indicate the actual perceptual properties of second sound 30. As described above, audio interface module 16 may use previously stored data that indicates an association between the tone and information that indicates the caller is "Tom." Audio interface module 16 may store data that indicates an association between the distinct tempo of second sound 30 and information that indicates an email. In this way, audio interface module 16 may maintain data specifying that the tone indicates the sender is Tom and the tempo indicates the information is a missed call.

In the example of FIG. 1, I/O module 14 may provide, for output in parallel at one or more of speakers 26, the first and second sounds in the audio interface, such that the relationship between the first and second information is perceptible in the audio interface based at least in part on the at least one perceptual property shared between the first and second pluralities of perceptual properties. For instance, audio interface module 16 may cause I/O module 14 to send first sound 28, second sound 30, and third sound 32 to speakers 26 for output. Third sound 32 may indicate one or more social media updates. In some examples, audio interface module 16 may cause I/O module 14 to send one or more sounds for output based on an event. An event may be, but not limited to, a timer expiration, an asynchronous machine-driven event (e.g., a notification for new incoming information), or a user-driven event (e.g., a user provides an input to request output from the audio user interface). In some examples, providing, for output in parallel at one or more of speakers 26, may include computing device 10 sending audio signals for sounds to one or more of speakers 26. In other examples, providing, for output in parallel at one or more of speakers 26, may include computing device 2 performing one or more operations of computing device 10 and sending the sounds to computing device 10 which, in turn, sends audio signals for the sounds to one or more of speakers 26.

In some examples, audio interface module 16 may specify control data to control which of speakers 26 will output which particular sounds. For instance, audio interface module 16 may implement techniques for providing stereophonic sound, which may include multiple different channels through which different sounds may be output. Audio interface module 16 may implement techniques for providing three-dimensional sound, in which speakers 26 may, when outputting a sound, simulate localization of the sound at a spatial location that is defined based on a reference point. For instance, audio interface module 16 may send information to I/O module 14, that causes speakers 26 to simulate localization of the sound at specific spatial location relative to a reference point. In some examples, the reference point may be a user's head, while in other examples the reference point may be a location other than the user's head. One or more of audio interface module 16, I/O module 14, and/or speakers 26 may maintain information that define the one or more spatial locations, such that audio interface module 16, I/O module 14, and/or speakers 26 can specify to which spatial location a sound will be output.

I/O module 14, upon receiving indications of one or more sounds, and in some examples control data, may cause speakers 26 to output sounds 28, 30, and 32. In the example of FIG. 1, I/O module 14 causes first sound 28 to be output at spatial location 34A on the right-hand side of the user's face. I/O module 14 causes second sound 30 and third sound 32 to be output at spatial location 34B on the left-hand side of the user's face. Although two spatial locations are addressable by I/O module 14 in the example of FIG. 1, any number of spatial locations may be defined to simulate localization of sound at different spatial locations relative to a common reference point. I/O module 14 may define spatial locations at any location in a three-dimensional space. For purposes of illustration only, spatial locations 34 are illustrated with lines to illustrate approximate boundaries of the simulated localized sound, and such lines are not visible in operation to a user. Furthermore, the size of spatial locations 34 are for purposes of illustration only and may be larger and or smaller that shown in FIG. 1.

In some examples, I/O module 14 may cause speakers 26 to output sounds 28, 30, and 32 in parallel. Outputting two or more sounds in parallel may include outputting the two or more sounds such that the output of one sound at least partially overlaps with another sound. In some examples, outputting two or more sounds sequentially may include outputting at least two sounds successively such that the output of the two sounds do not overlap. Outputting two or more sounds in parallel may not include outputting two or more sounds sequentially.

By outputting sounds 28, 30, and 32 in parallel, a user of wearable apparatus 20 may determine multiple different pieces of information at the same or substantially the same time. In some examples, wearable apparatus 20 may determine multiple different pieces of information at the same or substantially the same time during a particular duration of time. In some examples, the particular duration of time may be defined by one or more values stored or accessed by the computing device. The relationship between first information and second information in the example of FIG. 1 may be perceptible to the user in the audio interface based at least in part on the at least one perceptual property (e.g., tone) shared between the first and second pluralities of perceptual properties of the respective first and second sounds. That is, continuing with the non-limiting example above, a user of wearable apparatus 20 may be able to determine that both an email and a missed call were received from Tom because the tone of each of sounds 28 and 30 are the same, but the tempo of first sound 28 indicates an email and the tempo of second sound 30 indicates the missed call. In this way, the shared perceptual property of tone indicates the relationship between the first information and the second information, while the different tempos allow the user to decipher between the email and missed to determine that both types of information are present.

Audio interface module 16 may receive an indication of user input that selects at least one of the first or second information associated respectively with first sound 28 and second sound 30. Based on hearing sounds 28, 30, and 32 through speakers 26, the user may select one or more of the sounds to receive additional detail about the information indicated by the sound. Audio interface module may receive one or more indications of user input from I/O module 14, which may receive data from input devices, sensors, etc. of computing device 10. User input may include, but is not limited to touch, kinetic, audio, optical, and/or other suitable forms of user input. In the example of FIG. 1, audio interface module 16 may receive an indication of user input that the user has turned his head in a right-ward direction toward spatial location 34A. Computing device 10 may determine, based on the indication of user input, to select information indicating the email from Tom based on the head turn to the right in the direction of first sound 28 associated with the email from Tom.

In accordance with techniques of the disclosure, computing device 10 may perform, based at least in part on the indication of user input, at least one operation corresponding to the user's selection. For example, audio interface module 16 may select information associated with the sound based on the user input. For instance, audio interface module 16 may send data to I/O module 14 that causes speakers to 26 to output verbal sound that includes a transcript of the email from Tom and/or metadata about the email, such as date received, date sent, subject, recipient(s), sender, etc.

In general, an operation may refer to any one or more actions that can be taken by one or more of computing device 10, computing device 2 and/or other computing devices. An operation may perform actions including but not limited to loading data, storing data, transmitting and/or outputting data, transforming data. Example operations may include, but are not limited to: outputting information (e.g., verbal and/or non-verbal sound, graphical output, haptic/kinetic output, etc.), sending and/or receiving data with another device, navigating through a hierarchical audio interface, receiving user input (e.g., verbal and/or non-verbal sound, visual input, haptic/kinetic input, etc.), executing/starting/stopping one or more applications.

Figure 2:
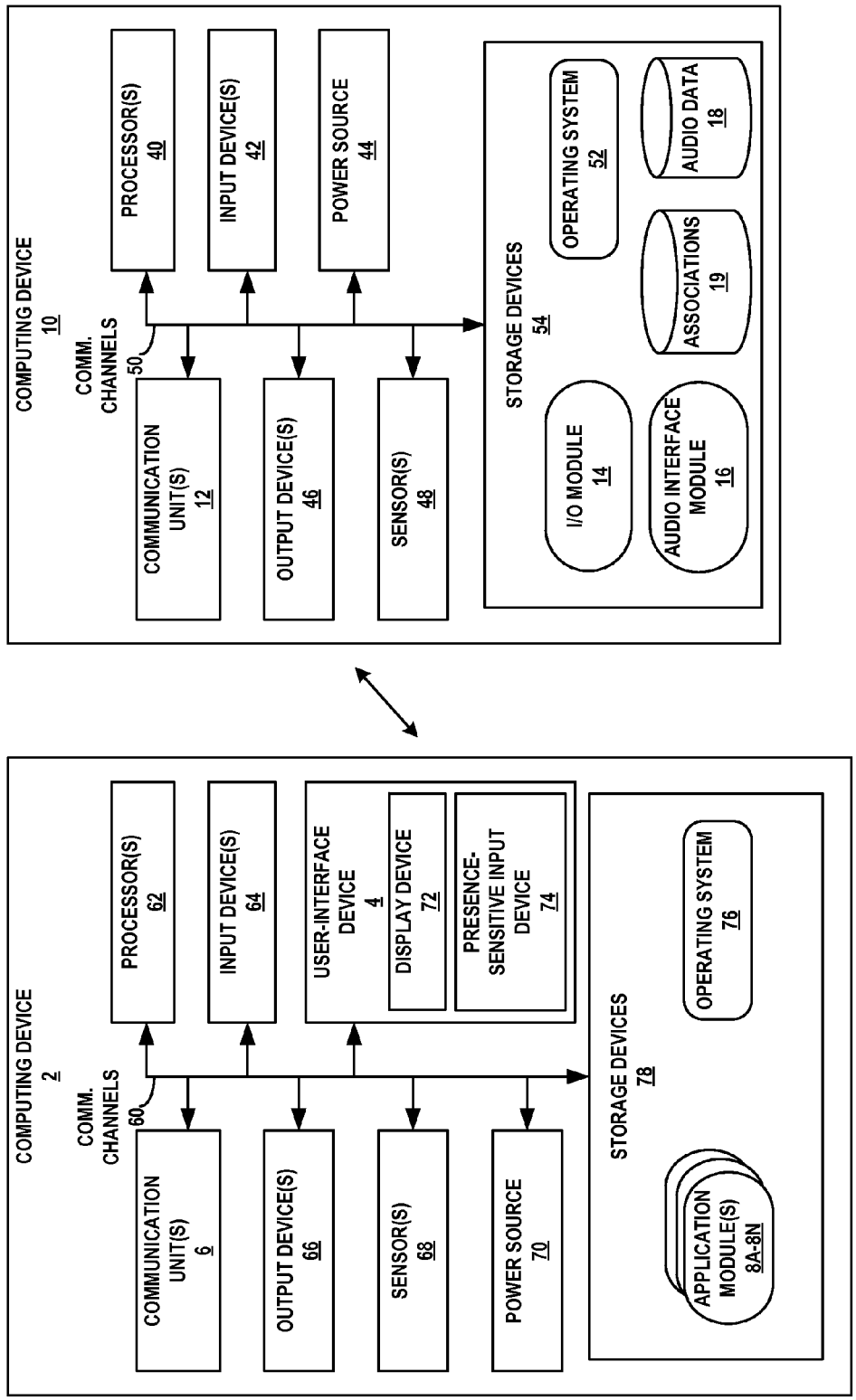
FIG. 2 is a block diagram illustrating two example computing devices, in accordance with one or more aspects of the present disclosure.

FIG. 2 is a block diagram illustrating two example computing devices, in accordance with one or more aspects of the present disclosure. FIG. 2 illustrates only two particular examples of computing device 2 and computing device 10 (as also illustrated in FIG. 1), and many other examples of computing device 2 and computing device 10 may be used in other instances and may include a subset of the components included in example computing device 2 and computing device 10 or may include additional components not shown in FIG. 2.

As shown in the example of FIG. 2, computing device 2 includes one or more processors 62, one or more input devices 64, one or more communication units 6, one or more output devices 66, one or more storage devices 78, and user-interface device 4. Storage devices 78 of computing device 2 also includes operating system 76 and application modules 8A-8N. Communication channels 60 may interconnect each of the components 4, 6, 8, 62, 64, 66, 68, 70, 76, and 78 for inter-component communications (physically, communicatively, and/or operatively). In some examples, communication channels 60 may include a system bus, a network connection, one or more inter-process communication data structures, or any other components for communicating data between hardware and/or software.

One or more input devices 64 of computing device 2 may receive input. Examples of input are tactile, audio, kinetic, and optical input. Input devices 64 of computing device 2, in one example, include a mouse, keyboard, voice responsive system, video camera, buttons, control pad, microphone or any other type of device for detecting input from a human or machine. In some examples, input device 64 may be a presence-sensitive input device, which may include a presence-sensitive screen, touch-sensitive screen, etc.

One or more output devices 66 of computing device 2 may generate output. Examples of output are tactile, audio, and video output. Output devices 66 of computing device 2, in one example, include a presence-sensitive screen, sound card, video graphics adapter card, speaker, cathode ray tube (CRT) monitor, liquid crystal display (LCD), or any other type of device for generating output to a human or machine. Output devices 66 may include display devices such as cathode ray tube (CRT) monitor, liquid crystal display (LCD), or any other type of device for generating tactile, audio, and/or visual output.

One or more communication units 6 of computing device 2 may communicate with external devices by transmitting and/or receiving data. For example, computing device 2 may use communication unit 6 to transmit and/or receive radio signals on a radio network such as a cellular radio network. In some examples, communication units 6 may transmit and/or receive satellite signals on a satellite network such as a Global Positioning System (GPS) network. Examples of communication unit 6 include a network interface card (e.g. such as an Ethernet card), an optical transceiver, a radio frequency transceiver, a GPS receiver, or any other type of device that can send and/or receive information. Other examples of communication units 6 may include Bluetooth®, GPS, 3G, 4G, and Wi-Fi® radios found in mobile devices as well as Universal Serial Bus (USB) controllers and the like.

In some examples, user-interface device 4 of computing device 2 may include functionality of input devices 64 and/or output devices 66. In the example of FIG. 2, user-interface device 4 may include a presence-sensitive input device 74, such as a presence-sensitive screen or touch-sensitive screen. In some examples, presence sensitive input device 74 may detect an object at and/or near the presence-sensitive input device. As one example range, presence-sensitive input device 74 may detect an object, such as a finger or stylus that is within 2 inches or less of presence-sensitive input device 74. Presence-sensitive input device 74 may determine a location (e.g., an (x,y) coordinate) of the presence-sensitive input device at which the object was detected. In another example range, presence-sensitive input device 74 may detect an object 6 inches or less from presence-sensitive input device 74 and other ranges are also possible. Presence-sensitive input device 74 may determine the location of presence-sensitive input device 74 selected by a user's finger using capacitive, inductive, and/or optical recognition techniques.

In some examples, user-interface device 4 may also provide output to a user using tactile, audio, or video stimuli as described with respect to output device 66. For instance, user-interface device 4 may include display device 72 that presents a graphical user interface. Display device 72 may be any type of output device that provides visual output, such as described with respect to output devices 66. While illustrated as an integrated component of computing device 2, user-interface device 4 may, in some examples, be an external component that shares a data path with other components of computing device 2 for transmitting and/or receiving input and output. For instance, user-interface device 4 may be a built-in component of computing device 2 located within and physically connected to the external packaging of computing device 2 (e.g., a screen on a mobile phone). In another example, user-interface device 4 may be an external component of computing device 2 located outside and physically separated from the packaging of computing device 2 (e.g., a monitor, a projector, etc. that shares a wired and/or wireless data path with a tablet computer). In some examples, user-interface device 4, when located outside of and physically separated from the packaging of computing device 2, may collectively refer to two components: a presence-sensitive input device for receiving input and a display device for providing output.

One or more storage devices 78 within computing device 2 may store information for processing during operation of computing device 2. In some examples, storage device 78 is a temporary memory, meaning that a primary purpose of storage device 78 is not long-term storage. Storage devices 78 on computing device 2 may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 78, in some examples, also include one or more computer-readable storage media. Storage devices 78 may be configured to store larger amounts of information than volatile memory. Storage devices 78 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 78 may store program instructions and/or data associated with operating system 76 and application modules 8A-8N.

As shown in FIG. 2, computing device 2 may include one or more sensors 68. Sensors 68 may include an accelerometer that generates accelerometer data. Accelerometer data may indicate an acceleration and/or a change in acceleration of computing device 2. Sensors 68 may include a gyrometer that generates gyrometer data. Gyrometer data may indicate a physical orientation and/or change in physical orientation of computing device 2. In some examples, the orientation may be relative to one or more reference points. Sensors 68 may include a magnetometer that generates magnetometer data. Magnetometer data may indicate the magnetization of an object that is touching or in proximity to computing device 2. Magnetometer data may indicate the Earth's magnetic field, and in some examples, provide directional functionality of a compass. Sensors 68 may include an ambient light sensor that generates ambient light data. The ambient light data may indicate an intensity of light to which computing device 2 is exposed. Sensors 68 may include a proximity sensor that generates proximity data. Proximity data may indicate whether an object is within proximity to computing device 68. In some examples, proximity data may indicate how close an object is to computing device 2. In some examples, sensors 68 may include a clock that generates a date and time. The date and time may be a current date and time.

As shown in FIG. 2, computing device 2 may include a power source 70. In some examples, power source 70 may be a battery. Power source 70 may provide power to one or more components of computing device 2. Examples of power source 70 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 70 may have a limited capacity (e.g., 1000-3000 mAh).

One or more processors 62 may implement functionality and/or execute instructions within computing device 2. For example, processors 62 on computing device 2 may receive and execute instructions stored by storage devices 78 that provide the functionality of operating system 76, and application modules 8A-8N. These instructions executed by processors 62 may cause computing device 2 to store and/or modify information, within storage devices 78 during program execution. Processors 62 may execute instructions of operating system 76 and application modules 8A-8N to perform one or more operations. That is, operating system 76 and application modules 8A-8N may be operable by processors 62 to perform various functions described herein.

As shown in the example of FIG. 2, computing device 10 includes one or more processors 40, one or more input devices 42, one or more communication units 12, one or more output devices 46, one or more storage devices 54. Storage devices 54 of computing device 2 also includes operating system I/O module 14, audio interface module 16, operating system 52, and audio data 18. Communication channels 50 may interconnect each of the components 12, 40, 42, 44, 46, 48, 54, 14, 16, 52, and 18 for inter-component communications (physically, communicatively, and/or operatively). In some examples, communication channels 50 may include a system bus, a network connection, one or more inter-process communication data structures, or any other components for communicating data between hardware and/or software.

One or more input devices 42 of computing device 10 may receive input. Examples of input are tactile, audio, kinetic, and optical input. Input devices 42 of computing device 10, in one example, include a mouse, keyboard, voice responsive system, video camera, microphone, buttons, control pad, or any other type of device for detecting input from a human or machine. In some examples, input device 64 may be a presence-sensitive input device, which may include a presence-sensitive screen or touch-sensitive screen.

One or more output devices 46 of computing device 10 may generate output. Examples of output are tactile, audio, and video output. Output devices 46 of computing device 10, in one example, include a presence-sensitive screen, sound card, video graphics adapter card, speaker, cathode ray tube (CRT) monitor, liquid crystal display (LCD), or any other type of device for generating output to a human or machine. Output devices 46 may include display devices such as cathode ray tube (CRT) monitor, liquid crystal display (LCD), or any other type of device for generating tactile, audio, and/or visual output.

One or more communication units 12 of computing device 10 may communicate with external devices by transmitting and/or receiving data. For example, computing device 10 may use communication unit 12 to transmit and/or receive radio signals on a radio network such as a cellular radio network. In some examples, communication units 12 may transmit and/or receive satellite signals on a satellite network such as a GPS network. Examples of communication unit 12 may include a network interface card (e.g. such as an Ethernet card), an optical transceiver, a radio frequency transceiver, a GPS receiver, or any other type of device that can send and/or receive information. Other examples of communication units 12 may include Bluetooth®, GPS, 3G, 4G, and Wi-Fi® radios found in mobile devices as well as Universal Serial Bus (USB) controllers and the like.

One or more storage devices 54 within computing device 10 may store information for processing during operation of computing device 10. In some examples, storage device 54 is a temporary memory, meaning that a primary purpose of storage device 54 is not long-term storage. Storage devices 54 on computing device 10 may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 54, in some examples, also include one or more computer-readable storage media. Storage devices 54 may be configured to store larger amounts of information than volatile memory. Storage devices 54 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 54 may store program instructions and/or data associated with I/O module 14, audio interface module 16, operating system 52, and audio data 18.

As shown in FIG. 2, computing device 10 may include one or more sensors 48. Sensors 48 may include an accelerometer that generates accelerometer data. Accelerometer data may indicate an acceleration and/or a change in acceleration of computing device 10. Sensors 48 may include a gyrometer that generates gyrometer data. Gyrometer data may indicate a physical orientation and/or change in physical orientation of computing device 10. In some examples, the orientation may be relative to one or more reference points. Sensors 48 may include a magnetometer that generates magnetometer data. Magnetometer data may indicate the magnetization of an object that is touching or in proximity to computing device 10. Magnetometer data may indicate the Earth's magnetic field, and in some examples, provide directional functionality of a compass. Sensors 48 may include an ambient light sensor that generates ambient light data. The ambient light data may indicate an intensity of light to which computing device 10 is exposed. Sensors 48 may include a proximity sensor that generates proximity data. Proximity data may indicate whether an object is within proximity to computing device 48. In some examples, proximity data may indicate how close an object is to computing device 10. In some examples, sensors 48 may include a clock that generates a date and time. The date and time may be a current date and time.

As shown in FIG. 2, computing device 10 may include a power source 44. In some examples, power source 44 may be a battery. Power source 44 may provide power to one or more components of computing device 10. Examples of power source 44 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 44 may have a limited capacity (e.g., 1000-3000 mAh).

One or more processors 44 may implement functionality and/or execute instructions within computing device 10. For example, processors 40 of computing device 10 may receive and execute instructions stored by storage devices 54 that provide the functionality of I/O module 14, audio interface module 16, operating system 52, and audio data 18. These instructions executed by processors 40 may cause computing device 10 to store and/or modify information, within storage devices 54 during program execution. Processors 40 may execute instructions of I/O module 14, audio interface module 16, operating system 52, and audio data 18 to perform one or more operations. That is, I/O module 14, audio interface module 16, operating system 52, and audio data 18 may be operable by processors 40 to perform various functions described herein.

In accordance with techniques of the disclosure, communication unit 12 may receive, in a non-limiting example, data indicating a calendar event from computing device 2, which may use communication unit 6 to send the data. Application module 8A, for example, may determine an upcoming calendar event and generate a calendar event notification, which communication unit 6 sends to communication unit 12 as data. Upon receiving the data from communication unit 12, audio interface module 16 may determine information included in the data.

In the example of FIG. 2, audio interface module 16 may determine fourth information that indicates an upcoming calendar event with a participant Tom, who was also the caller of the missed call and sender of the email in FIG. 1. Audio interface module 16 may also associate, for the audio interface, a fourth sound with the fourth information. The fourth sound may indicate fourth information and be characterized by a fourth plurality of perceptual properties that share at least one perceptual property with the first and second pluralities of perceptual properties in FIG. 1 based at least in part on a relationship between the fourth information to the first and second information.

Audio interface module 16 may determine one or more relationships between the fourth information (indicating the calendar event with participant Tom) and one or more of the first and second information (indicating the missed phone call from Tom and email from Tom). Based on determining that a relationship exists, audio interface module 16 may determine whether it has previously stored data indicating an association between a perceptual property, and the information that establishes the relationship.

In FIG. 2, audio interface module 16 previously stored data indicating a relationship between the perceptual property (e.g., distinct tone) and information that indicates "Tom." Audio interface module 16, using the previously stored data, may define and/or select a fourth sound, using audio data 18, based on the relationship between the perceptual property (e.g., tone) and information that indicates "Tom." The fourth sound may include the perceptual property (e.g., tone) associated with "Tom," and another perceptual property (e.g., a particular tempo) that indicates a type of information—e.g., calendar event. In this way, audio interface module 16 defines and/or selects the fourth sound to share at least one perceptual property with the first and/or second sounds, based at least in part on the relationship between the participant of the calendar event ("Tom), and the sender of the email ("Tom") and/or the caller of the missed call ("Tom").

Audio interface module 16 may store data in associations data store 19 that indicates an association between the fourth information and fourth sound. Audio interface module 16 may store data that indicates an association between the distinct tempo of the fourth sound and information that indicates a calendar event. In this way, audio interface module 16 may maintain data specifying that the tone indicates the meeting participant is Tom and the tempo indicates the information is a calendar event.

For instance, audio interface module 16 may cause I/O module 14 to send the first, second, third, and fourth sounds to the speakers for output. As in the example of FIG. 1, the third sound may indicate one or more social media updates. In some examples, audio interface module 16 may cause I/O module 14 to send one or more sounds for output based on an event. For instance, one of input devices 42 may have received an indication of user input to request output of information in the audio interface.

In the example of FIG. 2, audio interface module 16 sends indications of the first, second, third, and fourth sounds to I/O module 14. I/O module 14 upon receiving indications of one or more sounds may cause one or more of output devices 46 (e.g., speakers) to output the first, second, third, and fourth sounds. In the example of FIG. 2, I/O module 14 may cause output devices 46 to output the first, second, third, and fourth sounds in parallel, as described in FIG. 1. For instance, output devices 46 may output at least two of the first, second, third, and fourth sounds, such that the two sounds at least partially overlap during a particular duration of time. In some examples, the particular duration of time may be defined by one or more values stored or accessed by the computing device. The relationship between the at least two of the sounds that at least partially overlap in the example of FIG. 2 may be perceptible to the user in the audio interface based at least in part on the at least one perceptual property (e.g., tone) shared between the at least two sounds. Consequently, the shared perceptual property of tone may indicate the relationship between, for example, the first information and the fourth information (Tom is sender in email and participant in calendar event), while the different tempos allow the user to decipher between the email and calendar event to determine that both types of information are present.

Audio interface module 16 may receive an indication of user input from one or more of input devices 42 that selects, for example, the fourth information associated with the fourth sound. In FIG. 2, audio interface module 16 may receive may receive one or more indications of user input from I/O module 14, which may receive data from one or more of input devices 42. Audio interface module 16 may receive an indication of user input that the user has spoken the word "calendar." Audio interface module 16 may select information indicating the calendar event based on the verbal sound "calendar" spoken by the user and received as input.

Audio interface module 16 may select information associated with the fourth sound based on the user input. For instance, audio interface module 16 may send data to I/O module 14 that causes one or more of output devices 46 to output verbal sound that includes additional detail about the calendar event, such as the meeting location, tele/video conferencing information, etc. As described in FIG. 1, an operation may refer to any one or more actions that can be taken by one or more of computing device 10, computing device 2 and/or other computing devices.

In some examples, audio interface module 16 may define sounds for different types of information. A type of information may be any characteristic of information that enables a computing device to classify the information based on the characteristic. For instance, a type of information may indicate an asynchronous message. A type of information may also indicate an identity of a person, such as a name. To illustrate, audio interface module 16 may associate a first sound, such as a raspy, jazzy female voice, with a type of information that indicates asynchronous messages. Audio interface module 16 may also associate a second sound, such as a particular melody, with a type of information that indicates a particular identity of a person (e.g., the user's sister). Audio interface module 16 may associate a third sound, such as a tenor humming, with type of information that indicates a phone call.

Audio interface module 16 may generate a sound that includes at least a portion of two or more sounds to convey specific information to the user. For instance, audio interface module 16 may generate a sound that includes a first sound of a raspy, jazzy female voice combined with a second sound of particular melody associated with the user's sister. Audio interface module 16 may cause one or more speakers to output the third sound, which includes the first sound and the second sound. By outputting the third sound, which includes the first and second sounds, the first and second sounds are output in parallel. The user may determine that the computing device has received an asynchronous message from the user's sister because the first sound (raspy, jazzy female voice) indicates the asynchronous message, and the second sound (particular melody) indicates the user's sister. In this way, audio interface module 16 may output multiple sounds in parallel in indicate particular information.

In some examples, a first degree of similarity, in a first range of degrees of similarity, between a first sound and a second sound indicates a second degree of similarity of the relationship between first information and second information. For instance, audio interface module 16 may determine a degree of similarity between first information and second information. For instance, the stronger the relationship between facts of first information and second information, the greater the degree of similarity, and the weaker the relationship between facts of first information and second information, the weaker the degree of similarity.

Based on the degree of similarity between first and second information, audio interface module 16 may define one or more perceptual properties of the first sound and/or second sound indicate a degree of similarity between the first sound and second sound. For instance, audio module 16 determines a low degree of similarity between first and second information, audio interface module 16 may define one or more perceptual properties of the first sound and/or second sound indicate a low degree of similarity between the first sound and second sound. For instance, audio interface module 16 may, for first and second information that has a high degree of similarity, define one or more perceptual properties of the first sound and/or second sound to generate a more harmonious and less dissonant combined sound when the first and second sounds are outputted in parallel. Conversely, for first and second information that has a low degree of similarity, audio interface module 16 may define one or more perceptual properties of the first sound and/or second sound to generate a more dissonant and less harmonious combined sound when the first and second sounds are outputted in parallel. As another example, audio interface module 16 may cause first and second sounds to play on the same beat or off-beat one another based on the relationship between the first and second respective information. If the first and second information is related, first and second sounds play on the same beat. If the first and second information is not related, first and second sounds play on different beats (e.g., off-beat).

As another example, audio interface module 16 may define a tempo for first and second sounds based on the relationship between the first and second respective information. For instance, audio interface module 16 may decrease the time between repetitions of first and/or second sounds to indicate that the first and second information corresponding to first and second sounds are more closely related. Conversely, audio interface module 16 may increase the time between repetitions of first and/or second sounds to indicate that the first and second information corresponding to first and second sounds are more closely related.

In some examples, a user that wishes to select particular information associated with particular sound may provide, as user input, a vocal sound generated by the user that sounds like the particular sound. A vocal sound generated by a user may be a non-verbal sound that does not include words of a language but sounds as though generated by a human (e.g., humming, clicking, swishing, rasping, or any other wordless tone). Audio interface module 16 may determine a degree of similarity, within a range of degrees of similarity, between the vocal sound and a particular sound associated with particular information. For instance, audio interface module 16, may compare the vocal sound and the particular sound associated with the particular information using any suitable voice recognition technique to determine a degree of similarity between the vocal sound and the particular sound. Responsive to determining that the degree of similarity satisfies a threshold (e.g., is greater than the threshold), computing device 10 may perform at least one operation corresponding to the particular information.

Techniques of the disclosure may be performed using any suitable computing device configuration. For instance, as shown in FIGS. 1-2, computing device 10 may receive information from computing device 2 and perform techniques of the disclosure as described in FIGS. 1-2. In some examples, computing device 2 may be a portable computing device in proximity to computing device 10 (e.g., within a maximum range of Bluetooth, Near Field Communication, or WiFi communication), while in other examples computing device 2 may be a remote computing device, such as a server, that is not in proximity to computing device 10 (e.g., outside of the maximum range of Bluetooth, Near Field Communication, or WiFi communication). In any case, techniques of the disclosure may be distributed and/or divided across multiple computing devices. For instance, one or more operations of computing device 10 as described in this disclosure may be performed at computing device 2, rather than at computing device 10, and similarly, one or more operations of computing device 2 as described in this disclosure may be performed at computing device 10, rather than at computing device 2. In some examples, providing, for output in parallel at the audio device, may include a first computing device sending sounds to a second computing device that is operatively coupled to the audio device, such that the audio device outputs, in parallel, the first and second sounds received from the second computing device.

In some examples, as shown in FIG. 1, computing device 10 may be physically integrated with audio output devices 26. That is, computing device 10 and audio output device 26 may not be physically separate and may be physically incorporated into a common structure, such as smart headphones or other apparatus. In such examples, computing device 10 may be operatively coupled to audio output devices 26, such that computing device 10 may send audio signals for sounds to audio output devices 26 (e.g., using wireless communication or other suitable communication techniques).

In some examples, as shown in FIG. 1, computing device 10 may not be physically integrated with audio output devices 26. That is, computing device 10 and audio output device 26 may be physically separate and may not be physically incorporated into a common structure. In such examples, computing device 10 may still be operatively coupled to audio output devices 26, such that computing device 10 may send audio signals for sounds to audio output devices 26 (e.g., using wireless communication or other suitable communication techniques).

Figure 3:
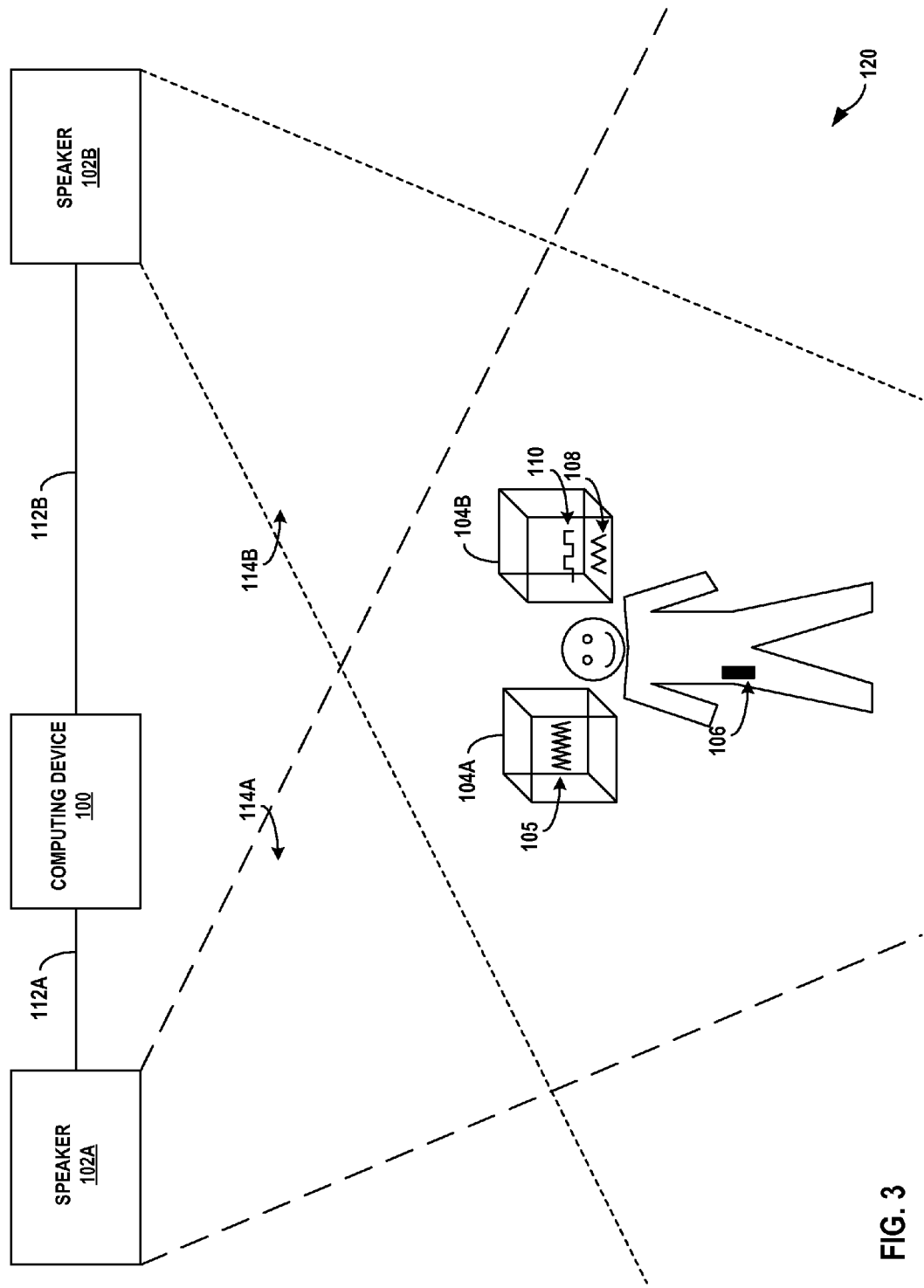
FIG. 3 is a conceptual diagram illustrating an example system that outputs, in parallel, multiple sounds with one or more shared perceptual properties that may indicate one or more relationships between information associated with the sounds, in accordance with one or more aspects of the present disclosure.

FIG. 3 is a conceptual diagram illustrating an example system that outputs, in parallel, multiple sounds with one or more shared perceptual properties, which may indicate one or more relationships between information associated with the sounds, in accordance with one or more aspects of the present disclosure. Example system 120 may include speakers 102A-102B ("speakers 102"), computing device 100, and computing device 106. Although shown with two speakers 102A-102B ("speakers 102"), any number of speakers may be used. System 120 may be implemented in any number of environments including, but not limited to, in-vehicle automotive audio systems, stationary and/or semi-fixed audio systems (such as a conference room or household room audio system), etc. System 120 comprises a system in which the speakers 102 that output two or more sounds in parallel are not attached to the user. Instead, as further described in the example of FIG. 3, the computing device 100 may cause speakers 102 to project the two or more sounds to simulate localization of the sounds at spatial locations that are addressable by computing device 100. Each spatial location may be a different, respective location relative to a common reference point.

As shown in FIG. 3, system 120 includes computing device 100. Computing device 100 may include the same components as computing device 10 as shown in FIGS. 1-2. For instance, computing device 100 may include one or more communications units, an I/O module, an audio interface module, and audio data that are the same as similarly named components described in FIGS. 1-2. In some examples, computing device 100 may include additional components or fewer components than computing device 10 as described in FIGS. 1-2. Although shown as physically separate from speakers 120, in some examples, one or more of speakers 120 may include a computing device 100 attached to and/or integrated with the speaker. In some examples, each respective speaker may include such a computing device 100, while in other examples, fewer than all of the speakers 120 may include a computing device 100, although all speakers may be controllable the one or more of such speakers.

System 120 may also include computing device 106. Computing device 106 may include the same components as computing device 2 as shown in FIGS. 1-2. For instance, computing device 2 may include a user-interface device, one or more communications units, and one or more application modules that are the same as similarly named components described in FIGS. 1-2. In some examples, computing device 106 may include additional components or fewer components than computing device 2 as described in FIGS. 1-2. Although computing device 106 is shown as a smartphone at the body of the user (e.g., in a compartment of apparel worn by the user, or in the user's hand), any suitable computing device as described in FIGS. 1-2 may be used.

In the example of FIG. 3, computing device 100 and computing device 106 may send and receive data between the respective devices. Computing device 100 and computing device 106 may send and receive such data using wired, wireless, or a combination of wired and wireless communication. In some examples, computing device 100 and computing device 106 may send and receive data using one or more networks. As such, data sent from one computing device to another may traverse multiple intermediate computing devices in the network, such as routers, switches, etc. Examples of network communication may include but are not limited to TCP/IP over Ethernet, etc. In some examples, computing device 100 and computing device 106 may send and receive data using direct communication in which no intermediate computing devices send and receive data between the two endpoints (i.e., computing device 100 and computing device 106). Examples of direct communication may include but are not limited to Bluetooth®, Wi-Fi®, Near-Field Communication, etc.

System 120 may include one or more audio output devices, for example, speakers 102. Speakers 102 may be operatively coupled to computing device 100 by one or more links 112A-112B ("links 112"). Links 112 may be any wired, wireless, or combination of wired and wireless connections that carry sound information between computing device 100 and speakers 102. For instance, links 112A-112B may be physical wires that carry electrical signals representing sounds to output at speakers 102. Speakers 102 may include one or more electroacoustic transducers that each produces sound in response to an electrical audio signal input. Speakers 102 may convert electrical signals to audio signals. For instance, an electrical signal representing a sound may be converted by speakers 102 to an audio signal, that when output may be perceptible by a human. In some examples, computing device 100 may include one or more output devices that convert digital representations of sounds into analog, electrical audio signal inputs to speakers 102, which in turn covert the audio signal inputs to audio signals.

Computing device 100 may control speakers 102 to simulate localization of sounds at one or more spatial locations. In some examples, computing device 100 may implement techniques for three-dimensional audio, which simulates localization of sounds at one or more spatial locations. Although described with respect to three-dimensional audio in FIG. 3, computing device 100 may implement any suitable techniques for simulating localization of sounds at one or more spatial locations.

In some examples, computing device 100 may address one or more spatial locations that are each relative to a common reference point. For instance, computing device 100 may maintain data that indicates respective, unique identifiers mapped to different respective, spatial locations. In this way, computing device 100, to simulate localization of a sound at a particular spatial location, may determine or select the unique identifier for the spatial location and cause the sound to be output such that the sound is simulated at the spatial location associated with the unique identifier. In some examples, computing device 100 may cause multiple sounds to be output in parallel, such that two or more of the sounds are outputted to simulate localization of the sounds at different spatial locations. In some examples, each spatial location may be a different location of a three-dimensional coordinate system. A spatial location may be a single point, or alternatively, may be a three-dimensional region in the three-dimensional coordinate system, as illustrated in FIGS. 1 and 3.

In some examples, a reference point for the spatial locations may be a computing device attached to the user, such as a computing device included in a piece of apparel worn by the user, held in the hand of the user, and/or affixed to the user. In some examples, the reference point may be a computing device not attached to the user. In some examples, the reference point may be location that does not correspond to a computing device. For instance, the reference point may correspond to an object in an environment that also includes the user, and the object may not be a computing device. In the example of FIG. 3, the reference point for spatial locations 104A and 104B may be computing device 106.

In FIG. 3, using the example information of FIG. 1, computing device 100 may receive data from one or more other computing devices, such as computing device 106. For instance, computing device 100 may receive from computing device 106, data indicating an email received at computing device 106. Computing device 100 may also receive from computing device 106, data indicating that a phone call was missed at computing device 106. Upon receiving the data from computing device 106, computing device 100 may determine information included in the data.

Computing device 100 may associate, in an audio interface, a first sound with first information, wherein the first sound is characterized by a first plurality of perceptual properties. The first information may be a new email from a sender Tom. Computing device 106 may have received the email and sent data to computing device 100 indicating the new email from the sender Tom. Computing device 100 may determine a first sound, and store data that indicates an association between the first information and first sound. The first sound may be characterized by one or more perceptual properties, such as a distinct tone and tempo. The one may indicate that the sender of the email is Tom and the tempo may indicate the communication is an email.

Computing device 100 may also associate, for the audio interface, a second sound with second information. The second sound may indicate second information and be characterized by a second plurality of perceptual properties that share at least one perceptual property with the first plurality of perceptual properties of the first sound associated with the first information, based at least in part on a relationship between the first information and the second information. For example, computing device 106 may determine a missed phone call has occurred and send data to computing device 100 indicating the missed call from the caller Tom. In the example of FIG. 3, the second information may indicate the missed call from caller Tom.

Computing device 100 may store data that indicates an association between the second information and the second sound. Computing device 100 may store data that indicates an association between a distinct tempo of the second sound and information that indicates an email. In this way, computing device 100 may maintain data specifying that the tone indicates the caller is Tom and the tempo indicates the information is a missed call.

In the example of FIG. 3, one or more of speakers 102 may output, the first and second sounds in parallel in the audio interface, such that the relationship between the first and second information is perceptible in the audio interface based at least in part on the at least one perceptual property shared between the first and second pluralities of perceptual properties. For instance, computing device 100 may send first sound 105, second sound 108, and third sound 110, as illustrated in FIG. 3, to one or more of speakers 102 for output. Third sound 110 may indicate one or more social media updates.

Using three-dimensional audio techniques, computing device 100 may determine unique identifiers for spatial locations 104A and 104B. Computing device 100, using the three-dimensional audio techniques and the unique identifiers, may send electrical signals to speakers 102A-102B to simulate localization of first sound 105 at spatial location 104A, and second sound 108 and third sound 110 at spatial location 104B. Speakers 102A-102B may output audio signals 114A from speaker 102A and audio signals 114B from speaker 102B to simulate localization of first sound 105 at spatial location 104A, and second sound 108 and third sound 110 at spatial location 104B. In some examples, the simulated localization of the sounds at specific spatial locations may be based on the intersection of audio signal 114A and 114B. Therefore, in the example of FIG. 3, although speakers 102 are not attached to the user or apparel of the user, speakers 102 may output, in parallel, the first and second sounds in the audio interface, such that the relationship between the first and second information is perceptible in the audio interface based at least in part on the at least one perceptual property shared between the first and second pluralities of perceptual properties.

By outputting sounds 106 and 108 in parallel, the user may determine multiple different pieces of information at the same or substantially the same time. The relationship between the first information and second information in the example of FIG. 3 may be perceptible to the user in the audio interface based at least in part on the at least one perceptual property (e.g., tone) shared between the first and second pluralities of perceptual properties of the respective first and second sounds, 106 and 108. That is, the user may be able to determine that both an email and a missed call were received from Tom because the tone of each of sounds 106 and 108 are the same, but the tempo of first sound 105 indicates an email and the tempo of second sound 108 indicates the missed call. Social media update 110 may have a different tone. In this way, the shared perceptual property of tone indicates the relationship between the first information and the second information, while the different tempos allow the user to decipher between the email and missed to determine that both types of information are present.

Computing device 100 may receive an indication of user input that selects at least one of the first or second information associated respectively with first sound 105 and second sound 108. Based on hearing sounds 106, 108, 110 from speakers 102, the user may select one or more of the sounds to receive additional detail about the information indicated by the sound. Computing device 100 may receive may receive one or more indications of user input from the user. In the example of FIG. 3, audio interface module 16 may receive an indication of user input from computing device 106 that the user has selected information indicating the email from Tom. Computing device 106, for instance, may output for display a graphical user interface that indicates the different first, second, and third information to select. Computing device 106 may receive an indication of user input (e.g., corresponding to a tap at a location of an input device), to select first information associated with first sound 105.

In accordance with techniques of the disclosure, computing device 100 and/or 106 may perform, based at least in part on the indication of user input, at least one operation corresponding to the user's selection. For example, computing device 100 and/or 106 may select information associated with the sound based on the user input. For instance, computing device 100 and/or 106 may cause speakers 102 to output verbal sound that includes a transcript of the email from Tom and/or metadata about the email, such as date received, date sent, subject, recipient(s), sender, etc. In an alternative example, computing device 100 and/or 106 may cause and output device of computing device 106 to output a transcript of the email from Tom and/or metadata about the email, such as date received, date sent, subject, recipient(s), sender, etc. In general, an operation may refer to any one or more actions that can be taken by one or more of computing device 100, computing device 106 and/or other computing devices.

Although computing device 106 is shown in FIG. 3 as attached to the user, in some examples, computing device 106 may not be included. That is, computing device 100 may simulate localization of sounds at spatial locations without computing device 106. For instance, computing device 100 may include a camera or other input device that can determine various features and/or portions of the user's body. Consequently, computing device 100, based on identifying the user's head, as one example, may simulate localization of sounds at various spatial locations. In this way, computing device 100 and speakers 102 may provide an audio interface that outputs sounds in parallel without the user necessarily requiring a computing device attached to the user or apparel of the user.

Figure 4A:
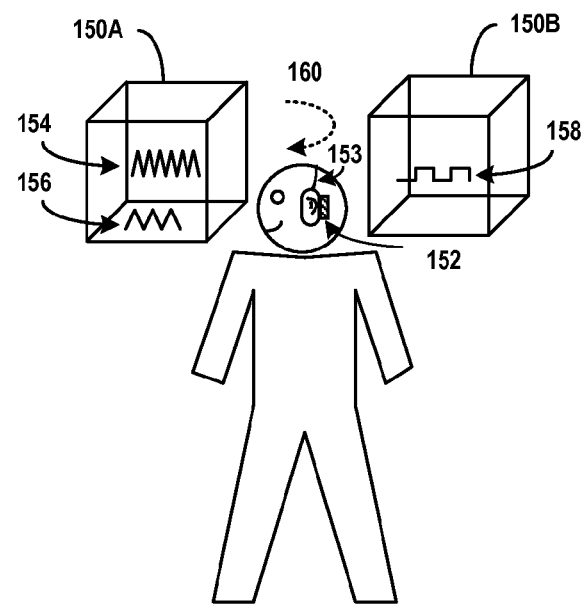
FIGS. 4A and 4B are conceptual diagrams illustrating hierarchical navigation for an audio interface that includes multiple sounds output in parallel with one or more shared perceptual properties, which may indicate one or more relationships between information associated with the sounds, in accordance with one or more aspects of the present disclosure.
Figure 4B:
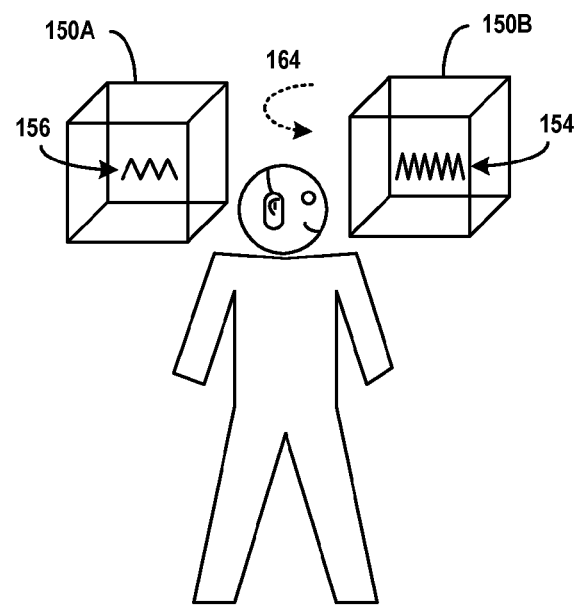

FIGS. 4A-4B are conceptual diagrams illustrating hierarchical navigation for an audio interface that includes multiple sounds output in parallel with one or more shared perceptual properties, which may indicate one or more relationships between information associated with the sounds, in accordance with one or more aspects of the present disclosure.

In the example of FIG. 4A, a user may have a wearable apparatus 153 attached to the user's body or apparel of the user. Wearable apparatus 153 may be any wearable apparatus described in FIGS. 1-3. Wearable apparatus 153 may include a computing device 152. Computing device 152 may be any suitable computing device as described in FIGS. 1-3. For instance, computing device 152 may be the same as computing device 10 in FIGS. 1-2. In accordance with techniques of the disclosure as described in FIGS. 1-3 and 5, wearable apparatus may output sounds 154, 156, and 158 in parallel. Wearable apparatus 153 may output sounds 154 and 156 such that the sounds appear to come from the right-hand side of the user when the user is looking forward. Wearable apparatus 153 may output sound 158 such that the sound appears to come from the left-hand side of the user when the user is looking forward. In some examples, wearable apparatus 153 may receive one or more indications of user input comprising one or more head turn gestures of a user. A head turn gesture may be motion of a user's head in a particular direction. The movement may be rotational, linear, or some combination of rotational and linear movement. The movement may occur in one or more directions of a three-dimensional space.

In accordance with techniques of the disclosure, if the user wishes to further investigate multiple sounds 154 and 156 on her right-hand side, she may perform a right-hand head turn 160. Computing device 152, using one or more sensors (e.g., an accelerometer and/or gyrometer that determines the motion), may determine right-hand head turn 160. Computing device 152 may determine that right-hand head turn 160 corresponds to respective, different information associated with sounds 154, 156 respectively. For instance, computing device 152 may determine, based at least in part on a direction of the head turn gesture, at least one of the sound 156 and second sound 154 that corresponds to the direction.

Computing device 152 performing, based at least in part on the at least one of sound 156 and sound 154 that corresponds to the direction, at least one operation. As shown in FIG. 4B, computing device 152 (not shown due to position on left-hand side of head), may update the audio interface to respectively output sounds 156 and 154 in spatial locations 150A and 150B. In some examples, wearable apparatus 153 may output sounds 154 and 156 with additional sound, such additional verbal or non-verbal sounds. The user may wish to further determine information associated with sound 154. The user may perform a left-hand head turn 164. Responsive to performing the left-hand head turn 164, computing device 152 may cause wearable apparatus 153 to output verbal sound, corresponding to information associated with sound 154, that includes a transcript of the email from Tom and/or metadata about the email, such as date received, date sent, subject, recipient(s), sender, etc. In this way, techniques of the disclosure may initially output multiple sounds in parallel that are associated with related information, and the user may navigate through the sounds to obtain greater detail about information associated with one or more of the sounds.

In some examples, techniques of the disclosure may provide for hierarchical navigation through an audio interface. Computing device 152 may include an audio interface module as described in this disclosure to provide for hierarchical navigation through an audio interface. For example, computing device 152 may output, for a root menu of a hierarchical audio interface, a first group of one or more sounds that are each respectively mapped to one or more respective, spatial locations addressable by computing device 152, wherein at least one sound of the first group of one or more sounds at the root menu is associated with an audio sub-menu of the hierarchical audio interface. A root menu of the hierarchical audio interface may include the first group of one or more sounds that are initially output when the hierarchical audio interface is provided to a user.

A root menu of the hierarchical audio interface, in some examples, may include at least one sound that is associated with an audio sub-menu. An audio sub-menu may include a second group of one or more audio sounds that are related to the at least one sound in the root menu of the hierarchical audio interface. For instance, a sound at the root menu may indicate a class of information, such as incoming textual communications (e.g., email, text messages, instant messages). The audio sub-menu of the sound for incoming textual communications may include different sub-classes of the information. For instance, the audio sub-menu of the sound for incoming textual communications may include a sub-menu with the sub-classes: email, text messages, instant messages.

A user may navigate from the root menu to a sub-menu using one or more indications of user input. For instance, computing device 152 may initially cause wearable apparatus to output the first group of one or more sounds included in root menu of a hierarchical audio interface. For example three separate sounds may be outputted at three different spatial locations. Computing device 152 may determine that the user has performed a head-turn gesture towards a first sound of the three sounds. The first sound may be associated with a sub-menu of the hierarchical audio interface. Computing device 152, based on the head-turn gesture may cause the wearable apparatus to output a second group of one or more sounds of the sub-menu at one or more spatial locations that are addressable by computing device 152. For instance, computing device 152, responsive to the head turn gesture, may cause wearable apparatus 153 to stop outputting the three sounds of the root menu and start outputting one or more sounds of the sub-menu. That is, computing device 152 may perform an operation that includes outputting, for the sub-menu of the hierarchical audio interface, a second plurality of sounds that are each respectively mapped to one or more of the respective, spatial locations addressable by the computing device.

One or more of the sounds of the sub-menu may further be associated with sub-menus. In this way, a user may provide indications of user input to navigate through a hierarchy of sub-menus that each include sounds. Although described with respect to head gestures, any indication of user input may be used including audio, video, kinetic, etc. Furthermore, in some examples, one or more indications of user input may be associated with moving up a hierarchy of sub-menus, moving backwards through a previously traversed path in the hierarchy of sub-menus, requesting additional information about the contents of sub-menus, or performing any other suitable operations for traversing through a hierarchical interface.

Figure 5:
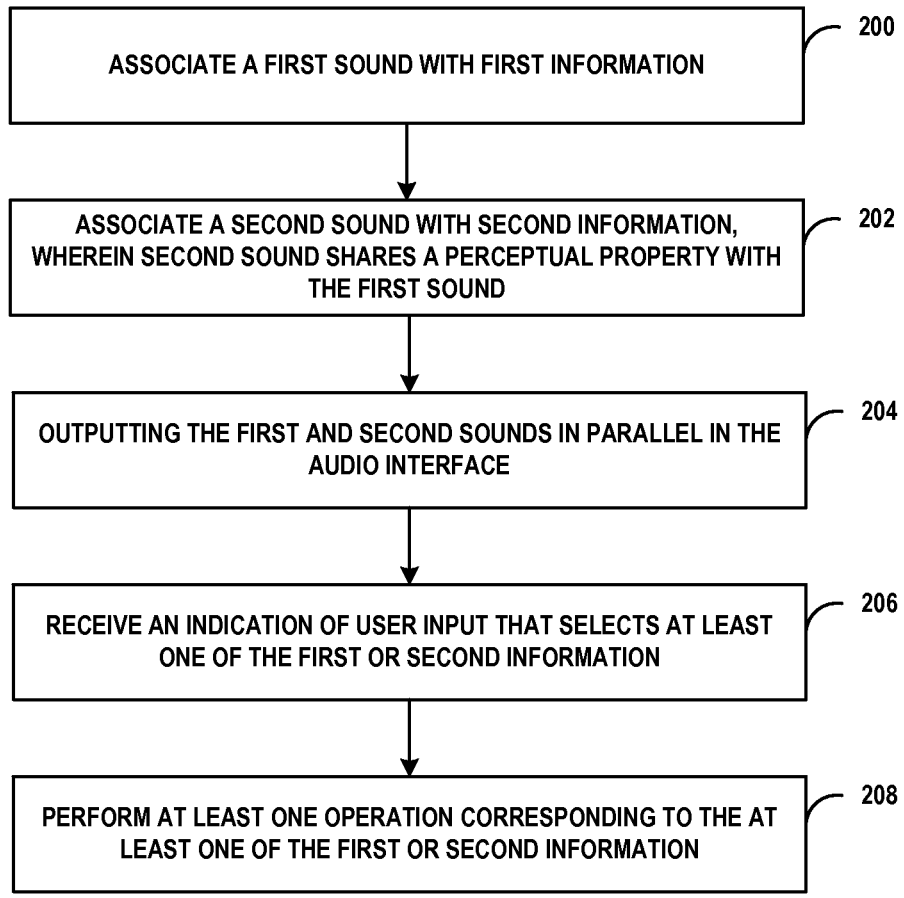
FIG. 5 is a flow diagram illustrating example operations of a computing device that implements techniques for outputting, in parallel, in an audio user interface, multiple sounds with one or more shared perceptual properties, which may indicate one or more relationships between information associated with the sounds, in accordance with one or more aspects of the present disclosure.

FIG. 5 is a flow diagram illustrating example operations of a computing device that implements techniques for outputting in parallel, in an audio user interface, multiple sounds with one or more shared perceptual properties, which may indicate one or more relationships between information associated with the sounds, in accordance with one or more aspects of the present disclosure. For purposes of illustration only, the example operations are described below within the context of computing device 10, as shown in FIGS. 1 and 2.

In the particular example of FIG. 5, computing device 10 may initially receive data that includes information indicating, for instance, an email (first information) and a missed call (second information), where the caller of the phone call and the sender of the email are the same person. Computing device 10 may associate, in an audio interface, a first sound with first information, the first sound characterized by a first plurality of perceptual properties (200). Computing device 10 may store data that indicates an association between the first sound and first information.

Computing device 10 may also associate, for the audio interface, a second sound with second information (202). The second sound (e.g., corresponding to missed call) may indicate second information and be characterized by a second plurality of perceptual properties that share at least one perceptual property with the first plurality of perceptual properties based at least in part on a relationship between the first information and the second information. Audio interface module 16 may store data that indicates an association between the second information and second sound.

In the example of FIG. 5, computing device 10 may cause one or more audio output devices (e.g., speakers) to output, the first and second sounds in parallel in the audio interface, such that the relationship between the first and second information is perceptible in the audio interface based at least in part on the at least one perceptual property shared between the first and second sounds (204). By outputting the first and second sounds in parallel, a user may determine multiple different pieces of information at the same or substantially the same time. The relationship between the first information and second information may be perceptible to the user in the audio interface based at least in part on the at least one perceptual property (e.g., tone) shared between the first and second pluralities of perceptual properties of the respective first and second sounds. That is, a user may be able to determine, for example, that both an email and a missed call were received from the same person because a perceptual property of each of the first and second sounds are the same.

Computing device 10 may receive an indication of user input that selects at least one of the first or second information associated respectively with the first sound and the second sound (206). Based on hearing the first and second sounds, the user may select one or more of the sounds to receive additional detail about the information indicated by the sound. For example, computing device 10 may perform, based at least in part on the indication of user input, at least one operation corresponding to the user's selection (208). For example, computing device 10 may select information associated with the sound based on the user input.

Example 1

A method comprising associating, for an audio interface, a first sound with first information, the first sound characterized by a first plurality of perceptual properties; associating, for the audio interface, a second sound with second information, wherein the second sound indicates the second information and is characterized by a second plurality of perceptual properties that share at least one perceptual property with the first plurality of perceptual properties based at least in part on a relationship between the first information and the second information; providing, for output in parallel at an audio output device, the first and second sounds in the audio interface, such that the relationship between the first and second information is perceptible in the audio interface based at least in part on the at least one perceptual property shared between the first and second pluralities of perceptual properties; receiving an indication of user input that selects at least one of the first or second information; and performing, based at least in part on the indication of user input, at least one operation corresponding to the at least one of the first or second information.

Example 2

The method of Example 1, wherein associating the second sound with the second information further comprises: determining at least one relationship between the first information and the second information; determining, based at least in part on the at least one relationship, one or more perceptual properties for the second sound; and defining the second sound to include the one or more perceptual properties for the second sound.

Example 3

The method of any of Examples 1-2, wherein the first and second pluralities of perceptual properties each comprise one or more of a melody, a harmony, a rhythm, a tone, a form, a tempo, dynamics, a pitch, a timbre, an intensity, and a duration of the respective first sound or second sound.

Example 4

The method of any of Examples 1-3, wherein the relationship between the first information and the second information is based at least in part on at least one of: a name, a location, an urgency of information, an importance of information, a time of information, or a type of information.

Example 5

The method of any of Examples 1-4, further comprising: generating a third sound that includes at least a portion of the first sound and at least a portion of the second sound, and wherein outputting in parallel, using the audio output device, the first and second sounds in the audio interface further comprises outputting the third sound that includes the first sound and the second sound.

Example 6

The method of any of Examples 1-5, wherein a first degree of similarity, in a first range of degrees of similarity, between the first sound and the second sound indicates a second degree of similarity of the relationship between the first information and the second information.

Example 7

The method of any of Examples 1-6, wherein the audio output device is included in at least one of: smart headphones, an in-vehicle automotive audio system, an optical head-mounted computing device, in-ear headphones, an ear-mounted computing device, a wrist-mounted computing device, a stationary audio system, and a semi-fixed audio system.

Example 8

The method of any of Examples 1-7, wherein the first information and second information each comprises at least one of: an email, an instant message, a text message, a social media communication, a missed call, a voicemail, a calendar event, a location, a news event, or a weather event.

Example 9

The method of any of Examples 1-8, wherein outputting in parallel the first and second sounds further comprises outputting the second sound to at least partially overlap with the first sound during a period of time.

Example 10

The method of any of Examples 1-9, wherein the indication of user input indicates a vocal sound generated by a user, and wherein performing the at least one operation corresponding to the at least one of the first or second information further comprises: determining a degree of similarity, within a range of degrees of similarity, between the vocal sound and the first or second sound associated with the at least one of the first or second information indicated by the user input; and responsive to determining that the degree of similarity satisfies a threshold, performing the at least one operation corresponding to the at least one of the first or second information.

Example 11

The method of any of Examples 1-10, further comprising: receiving, by a computing device operatively coupled to the audio output device, at least one of the first information or the second information from a remote computing device.

Example 12

The method of any of Examples 1-11, wherein the indication of user input comprises a head turn gesture of a user, wherein receiving the indication of user input that selects at least one of the first or second information further comprises determining, based at least in part on a direction of the head turn gesture, at least one of the first sound and the second sound that corresponds to the direction, and wherein performing the at least one operation further comprises performing, based at least in part on the at least one of the first sound and the second sound that corresponds to the direction, the at least one operation.

Example 13

The method of any of Examples 1-12, wherein the audio interface is a hierarchical audio interface, the method further comprising: outputting, for a root menu of the hierarchical audio interface, a first plurality of sounds that are each respectively mapped to one or more respective, spatial locations addressable by a computing device, wherein at least one sound of the first plurality of sounds at the root menu is associated with an audio sub-menu of the hierarchical audio interface; and wherein performing the at least one operation comprises outputting, for the sub-menu of the hierarchical audio interface, a second plurality of sounds that are each respectively mapped to one or more of the respective, spatial locations addressable by the computing device.

Example 14

A computer-readable storage medium encoded with instructions that, when executed, cause at least one processor of a computing device to: associate, for an audio interface, a first sound with first information, the first sound characterized by a first plurality of perceptual properties; associate, for the audio interface, a second sound with second information, wherein the second sound indicates the second information and is characterized by a second plurality of perceptual properties that share at least one perceptual property with the first plurality of perceptual properties based at least in part on a relationship between the first information and the second information; provide, for output in parallel at an audio output device, the first and second sounds in the audio interface, such that the relationship between the first and second information is perceptible in the audio interface based at least in part on the at least one perceptual property shared between the first and second pluralities of perceptual properties; receive an indication of user input that selects at least one of the first or second information; and perform, based at least in part on the indication of user input, at least one operation corresponding to the at least one of the first or second information.

Example 15

The computer-readable storage medium of Example 14, further comprising instructions that, when executed, cause at least one processor to: determine at least one relationship between the first information and the second information; determine, based at least in part on the at least one relationship, one or more perceptual properties for the second sound; and define the second sound to include the one or more perceptual properties for the second sound.

Example 16

A computing device comprising: at least one processor; and at least one module, operable by the at least one processor to: associate, for an audio interface, a first sound with first information, the first sound characterized by a first plurality of perceptual properties; associate, for the audio interface, a second sound with second information, wherein the second sound indicates the second information and is characterized by a second plurality of perceptual properties that share at least one perceptual property with the first plurality of perceptual properties based at least in part on a relationship between the first information and the second information; provide, for output in parallel at an audio output device, the first and second sounds in the audio interface, such that the relationship between the first and second information is perceptible in the audio interface based at least in part on the at least one perceptual property shared between the first and second pluralities of perceptual properties; receive an indication of user input that selects at least one of the first or second information; and perform, based at least in part on the indication of user input, at least one operation corresponding to the at least one of the first or second information.

Example 17

The computing device of Example 16, wherein the at least one module is further operable by the at least one processor to: determine at least one relationship between the first information and the second information; determine, based at least in part on the at least one relationship, one or more perceptual properties for the second sound; and define the second sound to include the one or more perceptual properties for the second sound.

Example 18

The computing device of any of Examples 16-17, wherein the first and second pluralities of perceptual properties each comprise one or more of a melody, a harmony, a rhythm, a tone, a form, a tempo, dynamics, a pitch, a timbre, an intensity, and a duration of the respective first sound or second sound.

Example 19

The computing device of any of Examples 16-18, wherein the at least one module is further operable by the at least one processor to: generate a third sound that includes at least a portion of the first sound and at least a portion of the second sound, and output the third sound that includes the first sound and the second sound.

Example 20

The computing device of any of Examples 16-19, wherein the at least one module is further operable by the at least one processor to output the second sound to at least partially overlap with the first sound during a period of time.

Example 21

A computing device comprising means for associating, for an audio interface, a first sound with first information, the first sound characterized by a first plurality of perceptual properties; means for associating, for the audio interface, a second sound with second information, wherein the second sound indicates the second information and is characterized by a second plurality of perceptual properties that share at least one perceptual property with the first plurality of perceptual properties based at least in part on a relationship between the first information and the second information; means for outputting in parallel, using an audio output device, the first and second sounds in the audio interface, such that the relationship between the first and second information is perceptible in the audio interface based at least in part on the at least one perceptual property shared between the first and second pluralities of perceptual properties; means for receiving an indication of user input that selects at least one of the first or second information; and means for performing, based at least in part on the indication of user input, at least one operation corresponding to the at least one of the first or second information.

Example 22

A computing device comprising means for performing the method of any of Examples 1-13.

Example 23

The method of any of Examples 1-13, wherein the audio output device is not physically integrated with the computing device, and wherein the audio output device is operatively coupled to the computing device.

Example 24

The method of any of Examples 1-14, wherein the computing device is a first computing device, wherein providing, for output in parallel at the audio device, comprises sending the first and second sounds to a second computing device that is operatively coupled to the audio device, such that the audio device outputs, in parallel, the first and second sounds from the second computing device.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
receiving, by a computing device and from one or more remote computing devices, first information and second information, wherein the first information is associated with and provided by a person, and wherein the second information is also associated with and provided by the person;
associating, by the computing device and in an audio interface, a first sound with the first information, wherein the first sound is a first non-verbal sound having a first plurality of perceptual properties;
associating, by the computing device and in the audio interface, a second sound with the second information, wherein the second sound is a second non-verbal sound having a second plurality of perceptual properties, wherein the first plurality of perceptual properties and the second plurality of perceptual properties share at least one common perceptual property indicative of one or more relationships between the first information and the second information, the one or more relationships comprising at least an identity of the person who is associated with both the first information and also with the second information, and further wherein the first plurality of perceptual properties and the second plurality of perceptual properties have at least one different perceptual property indicative of at least one difference between the first information and the second information;
outputting, by the computing device and via an audio output device, the first sound in parallel with the second sound at least during a period of time;
receiving an indication of user input comprising a head turn gesture of a user;
determining, based at least in part on a direction of the head turn gesture, that the direction corresponds to the first sound; and
performing, based at least in part on the determining, at least one operation corresponding to the first information.

2. The method of claim 1, wherein associating the second sound with the second information comprises:
determining the one or more relationships between the first information and the second information;
determining, based at least in part on the one or more relationships, the second plurality of perceptual properties for the second sound; and
defining the second sound to include the second plurality of perceptual properties.

3. The method of claim 1, wherein the first and second pluralities of perceptual properties each comprise one or more of a melody, a harmony, a rhythm, a tone, a form, a tempo, dynamics, a pitch, a timbre, an intensity, or a duration of the respective first sound or second sound.

4. The method of claim 1, wherein the one or more relationships between the first information and the second information are further based at least in part on at least one of: a location, an urgency of information, an importance of information, a time of information, a length of information, or a type of information.

5. The method of claim 1, wherein a first degree of similarity, in a first range of degrees of similarity, between the first sound and the second sound indicates a second degree of similarity of the one or more relationships between the first information and the second information.

6. The method of claim 1, wherein the audio output device is included in at least one of: smart headphones, an in-vehicle automotive audio system, an optical head-mounted computing device, in-ear headphones, an ear-mounted computing device, a wrist-mounted computing device, a stationary audio system, or a semi-fixed audio system.

7. The method of claim 1, wherein the first information and second information each comprise at least one of: an email, an instant message, a text message, a social media communication, a missed call, a voicemail, a calendar event, a location, a news event, or a weather event.

8. The method of claim 1,
wherein the indication of user input further indicates a vocal sound generated by a user, and
wherein performing the at least one operation corresponding to the first information comprises:
determining a degree of similarity, within a range of degrees of similarity, between the vocal sound and the first sound; and
responsive to determining that the degree of similarity satisfies a threshold, performing the at least one operation corresponding to the first information.

9. The method of claim 1, wherein the audio interface is a hierarchical audio interface, the method further comprising:
outputting, for a root menu of the hierarchical audio interface, a first plurality of sounds that are each respectively mapped to one or more respective spatial locations addressable by the computing device, wherein at least one sound of the first plurality of sounds at the root menu is associated with an audio sub-menu of the hierarchical audio interface,
wherein performing the at least one operation comprises outputting, for the sub-menu of the hierarchical audio interface, a second plurality of sounds that are each respectively mapped to one or more of the respective spatial locations addressable by the computing device.

10. The method of claim 1,
wherein the audio output device is not physically integrated with the computing device, and
wherein the audio output device is operatively coupled to the computing device.

11. A non-signal, non-transitory computer-readable storage medium encoded with instructions that, when executed, cause at least one processor to:
receive, from one or more remote computing devices, first information and second information, wherein the first information is associated with and provided by a person, and wherein the second information is also associated with and provided by the person;
associate, in an audio interface, a first sound with the first information, wherein the first sound is a first non-verbal sound having a first plurality of perceptual properties;
associate, in the audio interface, a second sound with the second information, wherein the second sound is a second non-verbal sound having a second plurality of perceptual properties, wherein the first plurality of perceptual properties and the second plurality of perceptual properties share at least one common perceptual property indicative of one or more relationships between the first information and the second information, the one or more relationships comprising at least an identity of the person who is associated with both the first information and also with the second information, and further wherein the first plurality of perceptual properties and the second plurality of perceptual properties have at least one different perceptual property indicative of at least one difference between the first information and the second information;

output, via an audio output device, the first sound in parallel with the second sound at least during a period of time;

receive an indication of user input comprising a head turn gesture of a user;

determine, based at least in part on a direction of the head turn gesture, that the direction corresponds to the first sound; and perform, based at least in part on the determining, at least one operation corresponding to the of the first information.

12. The non-signal, non-transitory computer-readable storage medium of claim 11, further comprising instructions that, when executed, cause at least one processor to:

determine the one or more relationships between the first information and the second information;

determine, based at least in part on the one or more relationships, the second plurality of perceptual properties for the second sound; and define the second sound to include the second plurality of perceptual properties.

13. A system comprising:

at least one processor; and at least one computer-readable storage media storing instructions that are executable by the at least one processor to:

receive, from one or more remote computing devices, first information and second information, wherein the first information is associated with and provided by a person, and wherein the second information is also associated with and provided by the person;

associate, for an audio interface, a first sound with the first information, wherein the first sound is a first non-verbal sound having a first plurality of perceptual properties;

associate, in the audio interface, a second sound with the second information, wherein the second sound is a second non-verbal sound having a second plurality of perceptual properties, wherein the first plurality of perceptual properties and the second plurality of perceptual properties share at least one common perceptual property indicative of one or more relationships between the first information and the second information, the one or more relationships comprising at least an identity of the person who is associated with both the first information and also with the second information, and further wherein the first plurality of perceptual properties and the second plurality of perceptual properties have at least one different perceptual property indicative of at least one difference between the first information and the second information;

output, via an audio output device, the first sound in parallel with the second sound at least during a period of time;

receive an indication of user input comprising a head turn gesture of a user;

determine, based at least in part on a direction of the head turn gesture, that the direction corresponds to the first sound; and perform, based at least in part on the determining, at least one operation corresponding to the of the first information.

14. The system of claim 13, wherein the instructions are further executable by the at least one processor to:

determine the one or more relationships between the first information and the second information;

determine, based at least in part on the one or more relationships, the second plurality of perceptual properties for the second sound; and define the second sound to include the second plurality of perceptual properties.

15. The system of claim 13, wherein the first and second pluralities of perceptual properties each comprise one or more of a melody, a harmony, a rhythm, a tone, a form, a tempo, dynamics, a pitch, a timbre, an intensity, or a duration of the respective first sound or second sound.

* * * * *